United States Patent
Lee et al.

(10) Patent No.: US 8,896,664 B2
(45) Date of Patent: Nov. 25, 2014

(54) METHOD AND APPARATUS FOR PROCESSING A BROADCAST SIGNAL FOR 3D BROADCAST SERVICE

(75) Inventors: Joonhui Lee, Seoul (KR); Jee Hyun Choe, Seoul (KR); Jongyeul Suh, Seoul (KR); Jeonghyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 539 days.

(21) Appl. No.: 13/236,105

(22) Filed: Sep. 19, 2011

(65) Prior Publication Data

US 2012/0069146 A1    Mar. 22, 2012

Related U.S. Application Data

(60) Provisional application No. 61/384,306, filed on Sep. 19, 2010.

(51) Int. Cl.
*H04N 13/00*  (2006.01)
*H04N 19/597*  (2014.01)

(52) U.S. Cl.
CPC ..... *H04N 19/00769* (2013.01); *H04N 13/0062* (2013.01); *H04N 13/0048* (2013.01); *H04N 2213/003* (2013.01)
USPC ............... 348/43; 348/42; 600/101; 385/117; 356/241.1

(58) Field of Classification Search
CPC .................... H04N 13/0048; H04N 19/00769; H04N 13/0062; H04N 13/0055; H04N 13/0059; H04N 7/08; H04N 7/26
USPC .................................................. 348/43, 42
See application file for complete search history.

(56) References Cited

U.S. PATENT DOCUMENTS

| | | | |
|---|---|---|---|
| 8,120,643 B2 * | 2/2012 | Ikuta et al. ...................... 348/43 |
| 2002/0009137 A1 * | 1/2002 | Nelson et al. ............. 375/240.1 |
| 2003/0169368 A1 | 9/2003 | Hamada et al. |
| 2003/0198290 A1 | 10/2003 | Millin et al. |
| 2004/0032980 A1 * | 2/2004 | Harman ........................ 382/154 |
| 2005/0088574 A1 * | 4/2005 | Suzuki et al. ................. 348/663 |
| 2008/0310499 A1 * | 12/2008 | Kim et al. ................ 375/240.01 |

(Continued)

FOREIGN PATENT DOCUMENTS

| | | |
|---|---|---|
| EP | 2360930 | 8/2011 |
| KR | 10-2006-0054872 A | 5/2006 |

(Continued)

OTHER PUBLICATIONS

Taner et al, Detection and Encoding of occluded areas in very low bit rate video coding, 1996.*

*Primary Examiner* — Andy Rao
*Assistant Examiner* — Shan Elahi
(74) *Attorney, Agent, or Firm* — McKenna Long & Aldridge LLP

(57) ABSTRACT

The disclosed method for processing a broadcast signal for 3D (3-Dimensional) broadcast service comprises encoding 2D (2-Dimensional) video stream including a 2D video frame, encoding depth information including depth of a 3D image relative to a plane of a display, encoding signaling information for signaling the encoded 2D video stream and the depth information, wherein the signaling information includes a 3D service location descriptor including codec type information specifying encoding type of the encoded depth information, generating the broadcast signal including the encoded 2D video stream, depth information and signaling information, and transmitting the generated broadcast signal.

13 Claims, 32 Drawing Sheets

(56) References Cited

U.S. PATENT DOCUMENTS

| | | | |
|---|---|---|---|
| 2009/0040372 A1* | 2/2009 | Bae et al. | 348/436.1 |
| 2009/0060273 A1* | 3/2009 | Stephan et al. | 382/103 |
| 2010/0088721 A1* | 4/2010 | Hong et al. | 725/38 |
| 2010/0157025 A1* | 6/2010 | Suh et al. | 348/51 |
| 2010/0315489 A1* | 12/2010 | Shepherd | 348/46 |
| 2011/0063410 A1* | 3/2011 | Robert | 348/42 |
| 2011/0235999 A1* | 9/2011 | Quan et al. | 386/326 |
| 2011/0267442 A1* | 11/2011 | Imai et al. | 348/56 |
| 2011/0298795 A1* | 12/2011 | Van Der Heijden et al. | 345/419 |
| 2011/0298895 A1* | 12/2011 | Tian et al. | 348/46 |
| 2012/0044322 A1* | 2/2012 | Tian et al. | 348/43 |
| 2012/0120200 A1* | 5/2012 | Newton et al. | 348/46 |

FOREIGN PATENT DOCUMENTS

| | | | | |
|---|---|---|---|---|
| WO | 03/107678 A1 | 12/2003 | | |
| WO | WO 2005/114998 A1 | 12/2005 | | |
| WO | WO 2005114998 A1 * | 12/2005 | | H04N 7/08 |
| WO | WO 2008/123710 | 10/2008 | | |
| WO | WO 2010/010077 | 1/2010 | | |
| WO | WO 2010/071291 | 6/2010 | | |
| WO | 2010/096189 A1 | 8/2010 | | |
| WO | WO 2010126608 A2 * | 11/2010 | | H04N 7/26 |

\* cited by examiner

FIG. 10

| Syntax | No. of bits | Format |
|---|---|---|
| 3D_service_location_descriptor ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 1 | '1' |
|     number_elements | 7 | uimsbf |
|     for (j=0; j<number_elements; j++) { | | |
|         data_type | 8 | uimsbf |
|         reserved | 3 | '111' |
|         elementary_PID | 13 | uimsbf |
|         codec_type | 8 | uimsbf |
|         reserved | 3 | '1111' |
|         bit_depth_minus_1 | 4 | uimsbf |
|         same_resolution_flag | 1 | bslbf |
|         if (same_resolution_flag == 0) { | | |
|             horizontal_size | 16 | uimsbf |
|             vertical_size | 16 | uimsbf |
|         } | | |
|     } | | |
| } | | |

FIG. 11

| Syntax | No. of bits | Format |
|---|---|---|
| terrestrial_virtual_channel_table_section () { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for (i=0; i<num_channels_insection; i++) { | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequnecy | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0; i<N; i++) { | | |
|             descriptor() | | |
|         } | | |
|     } | | |
|     reserved | 6 | '111111' |
|     additional_descriptor_length | 10 | uimsbf |
|     for (j=0; j<N; j++) { | | |
|         additional_descriptor() | | |
|     } | | |
|     CRC_32 | 32 | rpchof |
| } | | | service_type, reserved (3 bits) → Specifying 3DTV service descriptor(), additional_descriptor() → Information for 2D video, Depth, Occlusion, Transparency data can be included for 3DTV service

| Value | Type |
|---|---|
| 0x10 | ATSC 3DTV service – The virtual channel carries 3D television programming (audio, video, and associated 3D metadata) |

FIG. 12

| Syntax | No. of bits | Format |
|---|---|---|
| 3D_service_location_descriptor ( ) { | | |
|     descriptor_tag | 8 | 0xTBD |
|     descriptor_length | 8 | uimsbf |
|     codec_type | 8 | uimsbf |
|     reserved | 3 | '1111' |
|     bit_depth_minus_1 | 4 | uimsbf |
|     same_resolution_flag | 1 | bslbf |
|     if (same_resolution_flag == 0) { | | |
|         horizontal_size | 16 | uimsbf |
|         vertical_size | 16 | uimsbf |
|     } | | |
| } | | |

FIG. 13

| Syntax | No. of bits | Format |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | umisbf |
|     reserved | 4 | bslbf |
|     program_info_length | 12 | uimsbf |
|     for(i=0;i<N;i++) { | | |
|         descriptor() | | |
|     } | | |
|     for(i=0;i<N1;i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0;i<N2;i++) { | | |
|             descriptor() | | |
|         } | | |
|     } | | |
|     CRC_32 | 32 | rpchof |
| } | | | descriptor() → Possible place for 3D_service_location_descriptor

FIG. 14

| Syntax | No. of bits | Format |
|---|---|---|
| 3D_service_location_descriptor ( ) { | | |
| descriptor_tag | 8 | 0xTBD |
| descriptor_length | 8 | uimsbf |
| reserved | 1 | '1' |
| number_elements | 7 | uimsbf |
| for (j=0; j<number_elements; j++) { | | |
| data_type | 8 | uimsbf |
| component_tag | 8 | uimsbf |
| codec_type | 8 | uimsbf |
| reserved | 3 | '1111' |
| bit_depth_minus_1 | 4 | uimsbf |
| same_resolution_flag | 1 | bslbf |
| if (same_resolution_flag == 0) { | | |
| horizontal_size | 16 | uimsbf |
| vertical_size | 16 | uimsbf |
| } | | |
| } | | |

FIG. 15

| Syntax | No. of bits | Identifier |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i = 0; i < N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j = 0; j < N; j++) { | | |
|             descriptor () | | |
|         } | | |
|     } | | |
|     CRC_32 | 32 | rpchof |
| } | | |

1) Notifying 3DTV service with service_type of Service descriptor.

2) Notifying 3DTV service with 3D_service_location_descriptor.

FIG. 16

| service_type | Description |
|---|---|
| 0x00 | reserved for future use |
| 0x01 | digital television service (see note 1) |
| 0x02 | digital radio sound service (see note 2) |
| 0x03 | Teletext service |
| 0x04 | NVOD reference service (see note 1) |
| 0x05 | NVOD time-shifted service (see note 1) |
| 0x06 | mosaic service |
| 0x07 | FM radio service |
| 0x08 | DVB SRM service [48] |
| 0x09 | reserved for future use |
| 0x0A | advanced codec digital radio sound service |
| 0x0B | advanced codec mosaic service |
| 0x0C | data broadcast service |
| 0x0D | reserved for Common Interface Usage (EN 50221 [37]) |
| 0x0E | RCS Map (see EN 301 790 [7]) |
| 0x0F | RCS FLS (see EN 301 790 [7]) |
| 0x10 | DVB MHP service |
| 0x11 | MPEG-2 HD digital television service |
| 0x12 to 0x15 | reserved for future use |
| 0x16 | advanced codec SD digital television service |
| 0x17 | advanced codec SD NVOD time-shifted service |
| 0x18 | advanced codec SD NVOD reference service |
| 0x19 | advanced codec HD digital television service |
| 0x1A | advanced codec HD NVOD time-shifted service |
| 0x1B | advanced codec HD NVOD reference service |
| 0x1F to 0x7F | reserved for future use |
| 0x80 to 0xFE | user defined |
| 0xFF | reserved for future use |

NOTE 1: MPEG-2 SD material should use this type.
NOTE 2: MPEG-1 Layer 2 audio material should use this type.

| service_type | Description |
|---|---|
| 0x12 | DVB 3DTV service – The virtual channel carries 3D television programming (audio, video, and associated 3D metadata) |

FIG. 17

| Syntax | Bits | Identifier |
|---|---|---|
| component_descriptor( ){ | | |
| descriptor_tag | 8 | uimsbf |
| descriptor_length | 8 | uimsbf |
| resrved_future_use | 4 | Bslbf |
| stream_content | 4 | uimsbf |
| component_type | 8 | uimsbf |
| component_tag | 8 | uimsbf |
| ISO 639-2 [3]_language_code | 24 | Bslbf |
| for (i=0;<N;i + +){ | | |
| text_char | 8 | uimsbf |
| } | | |
| } | | |

FIG. 18

| Stream_content | Component_type | Description |
|---|---|---|
| 0x01 | 0x01 | MPEG-2 video, 4:3 aspect ratio, 25Hz |
| 0x01 | 0x05 | MPEG-2 video, 4:3 aspect ratio, 30Hz |
| 0x01 | 0x13 | MPEG-2 video, 3D data, Depth stream |
| 0x01 | 0x14 | MPEG-2 video, 3D data, Occlusion stream |
| 0x01 | 0x15 | MPEG-2 video, 3D data, Transparency stream |
| 0x05 | 0x01 | H.264/AVC standard definition video, 4:3 aspect ratio, 25Hz |
| 0x05 | 0x05 | H.264/AVC standard definition video, 4:3 aspect ratio, 30Hz |
| 0x05 | 0x13 | H.264/AVC standard definition video, 3D data, Depth stream |
| 0x05 | 0x14 | H.264/AVC standard definition video, 3D data, Occlusion stream |
| 0x05 | 0x15 | H.264/AVC standard definition video, 3D data, Transparency stream |

FIG. 24

```
<simpleType name="TypeOfSourceType">
  <restriction base="string">
    <enumeration value="HD"/>
    <enumeration value="SD"/>
    <enumeration value="PIP"/>
    <enumeration value="SdBarker"/>
    <enumeration value="HdBarker"/>
    <enumeration value="PipBarker"/>
    <enumeration value="3DHD"/>
    <enumeration value="3DSD"/>
    <enumeration value="3DDOT"/>
  </restriction>
</simpleType>
```

FIG. 26

```
<complexType name="DOTStreamInformationType">
  <sequence>
    <element name="DataType" type="unsignedByte"/>
    <element name="CodecType" type="unsignedByte"/>
    <element name="BitDepthMinus1" type="unsignedByte"/>
    <element name="Resolution">
      <complexType>
        <choice minOccurs="0">
          <element name="HorizontalSize" type="unsignedInt"/>
          <element name="VerticalSize" type="unsignedInt"/>
        </choice>
        <attribute name="SameResolutionFlag" type="boolean" use="required"/>
      </complexType>
    </element>
  </sequence>
</complexType>
```

METHOD AND APPARATUS FOR PROCESSING A BROADCAST SIGNAL FOR 3D BROADCAST SERVICE

Pursuant to 35 U.S.C. §119(e), This application claims the benefit of U.S. Provisional Application No. 61/384,306 filed on Sep. 19, 2010, which is hereby incorporated by reference as if fully set forth herein.

BACKGROUND OF THE INVENTION

1. Field of the Invention

The present invention relates to three dimensional (3D) broadcasting, and more particularly to a method for processing a 3D video signal and a digital broadcast receiver for performing the processing method.

2. Discussion of the Related Art

Generally, a three dimensional (3D) image (or a stereoscopic image) provides user's eyes with a stereoscopic effect using the stereoscopic visual principle. A human being senses depth through a binocular parallax caused by a distance between their eyes spaced apart from each other by about 65 mm, such that the 3D image enables both right and left eyes to respectively view their associated planar images, and a human brain merges two different images with each other, resulting in a sense of depth and a sense of presence in the 3D image.

For example, the above-mentioned 3D image display method may be classified into a stereoscopic scheme, a volumetric scheme, a holographic scheme, etc. In addition, a 3D image display device adds depth information to two dimensional (2D) images or uses left view image information and right view image information, such that a user of the 3D image display device can feel a sense of vividness and a sense of reality in a 3D image.

In addition, a method for allowing the user to view the 3D image may be exemplarily classified into one method for providing the user with polarization glasses and another method where the user is not provided with polarization glasses.

A television according to the related art has been designed to display only a 2D image. In contrast, many developers and companies have recently conducted intensive research into a 3D imaging technology for use in digital broadcasting. However, detailed protocols related to a 3D broadcast signal processing technology have not been defined yet, so that broadcast content providers, broadcast stations, and DTV manufacturers have been thrown into a great confusion with regard to such 3D broadcast signal processing.

SUMMARY OF THE INVENTION

Accordingly, the present invention is directed to a a method and apparatus for processing a broadcast signal for a 3-dimensional (3D) broadcast service that substantially obviates one or more problems due to limitations and disadvantages of the related art.

An object of the present invention is to efficiently render a 2D broadcast image into a 3D image.

Another object of the present invention is to efficiently transmit signaling information required for rendering.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, A method for processing a broadcast signal for 3D (3-Dimensional) broadcast service comprises encoding 2D (2-Dimensional) video stream including a 2D video frame, encoding depth information including depth of a 3D image relative to a plane of a display, encoding signaling information for signaling the encoded 2D video stream and the depth information, wherein the signaling information includes a 3D service location descriptor including codec type information specifying encoding type of the encoded depth information, generating the broadcast signal including the encoded 2D video stream, depth information and signaling information, and transmitting the generated broadcast signal.

In another aspect of the present invention, the method further comprises encoding occlusion information for rendering the 2D video frame into a 3D video frame, and generating the broadcast signal including the encoded 2D video stream, depth information, signaling information and the occlusion information.

In another aspect of the present invention, the method further comprises encoding transparency information of an object in the 3D video frame for rendering the 2D video frame into a 3D video frame, and generating the broadcast signal including the encoded 2D video stream, depth information, signaling information, the occlusion information and the transparency information.

In another aspect of the present invention, the 3D service location descriptor is included in a virtual channel table (VCT) or a program map table (PMT).

In another aspect of the present invention, the 3D service location descriptor further includes data type information specifying which one among the depth information, the occlusion information and the transparency information is included in an element of the broadcast signal.

In another aspect of the present invention, the 3D service location descriptor further includes resolution information indicating whether a resolution of the 3D video frame is same as a resolution of the 2D video frame.

In another aspect of the present invention, the signaling information further includes component type information indicating whether a specific stream is a depth stream including the depth information, an occlusion stream including the occlusion information or a transparency stream including the transparency information.

To achieve these objects and other advantages and in accordance with the purpose of the invention, as embodied and broadly described herein, an apparatus for receiving a broadcast signal for 3D (3-Dimensional) broadcast service comprises a receiving unit configured to receive the broadcast signal including a 2D video stream including a 2D video frame, depth information and signaling information, a system information processor configured to parse a 3D service location descriptor including codec type information specifying encoding type of information included in the broadcast signal from the signaling information, wherein the depth information includes depth of a 3D image relative to a plane of a display, a first decoder configured to decode the 2D video stream, a second decoder configured to decode the depth information based on the codec type information and a formatter configured to render the 2D video frame into a 3D video frame based on the depth information.

In another aspect of the present invention, the broadcast signal further includes occlusion information for rendering the 2D video frame into a 3D video frame, the second decoder is further configured decode the occlusion information based on the codec type information, and the formatter is further configured to render the 2D video frame into a 3D video frame based on the depth information and the occlusion information.

In another aspect of the present invention, the broadcast signal further includes transparency information of an object in the 3D video frame for rendering the 2D video frame into a 3D video frame, the second decoder is further configured decode the transparency information based on the codec type information, and the formatter is further configured to render the 2D video frame into a 3D video frame based on the depth information, the occlusion information and the transparency information.

In another aspect of the present invention, the system information processor is further configured to parse a virtual channel table (VCT) or a program map table (PMT) from the signaling information and parse the 3D service location descriptor included in the virtual channel table (VCT) or the program map table (PMT).

In another aspect of the present invention, wherein the 3D service location descriptor further includes data type information specifying which one among the depth information, the occlusion information and the transparency information is included in an element of the broadcast signal, and the second decoder is further configured to decode the element based on the data type information.

In another aspect of the present invention, the 3D service location descriptor further includes resolution information indicating whether a resolution of the 3D video frame is same as a resolution of the 2D video frame.

In another aspect of the present invention, the signaling information further includes component type information indicating whether a specific stream is a depth stream including the depth information, an occlusion stream including the occlusion information or a transparency stream including the transparency information, and the second decoder is further configured to decode the depth stream, occlusion stream or transparency stream based on the component type information.

In another aspect of the present invention, the 3D service location descriptor further includes size information specifying horizontal and vertical size of the 3D video frame when the resolution information indicates that the resolution of the 3D video frame is different from the resolution of the 2D video frame.

According to an embodiment of the present invention, there is an advantage in that it is possible to efficiently provide a 3D broadcast service without imposing a burden on the broadcast bandwidth.

In addition, according to an embodiment of the present invention, there is an advantage in that it is possible to efficiently transmit and process signaling information required to provide a 3D broadcast service.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 shows a 3D service location descriptor according to one embodiment of the present invention.

FIG. 11 illustrates locations wherein the TVCT and the above-described descriptors can be included according to an embodiment of the present invention.

FIG. 12 illustrates a 3D service location descriptor according to another embodiment of the present invention.

FIG. 13 illustrates a location of a PMT and locations wherein the above-described descriptor can be included within the PMT according to an embodiment of the present invention.

FIG. 14 illustrates a 3D service location descriptor according to another embodiment of the present invention.

FIG. 15 illustrates a Service Description Table (SDT) and the location of a 3D service location descriptor in the SDT according to an embodiment of the present invention.

FIG. 16 illustrates the definition of each value of a service_type field according to an embodiment of the present invention.

FIG. 17 illustrates a component descriptor according to an embodiment of the present invention.

FIG. 18 illustrates the definitions of stream_content and component_type according to an embodiment of the present invention.

FIG. 24 illustrates an extension of an XML schema of a TypeOfSourceType for signaling depth, occlusion, and/or transparency streams according to an embodiment of the present invention.

FIG. 26 illustrates an XML Schema of a DOTStreamInformationType for containing 3D DOT stream information according to an embodiment of the present invention.

DETAILED DESCRIPTION OF THE INVENTION

Figure 1:
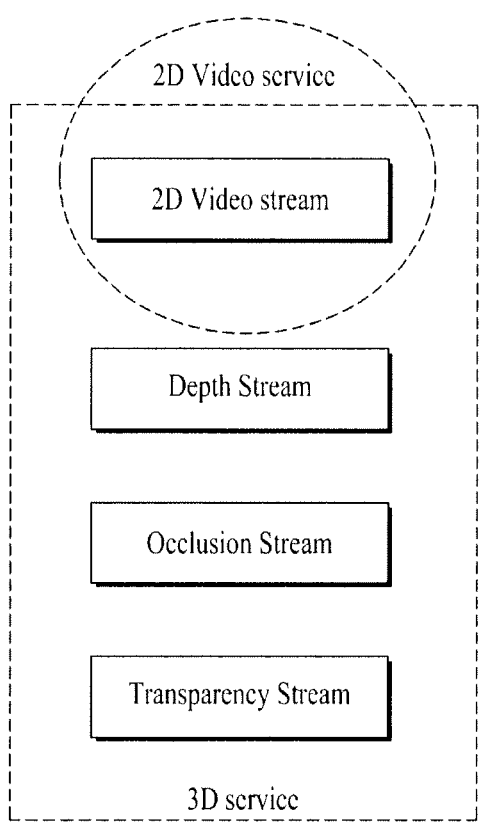
FIG. 1 illustrates elements for configuring a 3D video stream according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

In accordance with the following embodiments of the present invention, information capable of processing a 3D video signal is contained in system information. The system information may also be called service information. For example, the system information includes channel information, program information, event information, etc. In accordance with the embodiments of the present invention, the system information may be newly added to a Program Specific Information/Program and System Information Protocol (PSI/PSIP) as necessary. However, the scope and spirit of the present invention are not limited to the above-mentioned examples. If it is assumed that there is a protocol capable of transmitting the system information in table format, the scope and spirit of the present invention can also be applied to other examples irrespective of titles of the system information.

The PSI is disclosed only for illustrative purposes and better understanding of the present invention. The PSI may include a Program Association Table (PAT), a Conditional Access Table (CAT), a Program Map Table (PMT), a Network Information Table (NIT), etc.

The PAT corresponds to specific information which is transmitted by a packet having a PID of '0'. The PAT transmits PID information of the PMT and PID information of the NIT of each program. The CAT transmits information of a pay broadcast service used in the broadcast transmission system. The PMT transmits a program identification number, packet identifier (PID) information of a transport stream packet, in which individual bit streams of video and audio data constituting a program are transmitted, and PID information, in which a PCR (Program Clock Reference) is transmitted. The NIT transmits information of an actual transmission network. For example, PID information of a program number and the PMT may be acquired by parsing the PAT having a PID of '0'. In addition, in the case where the PMT acquired from the PAT is parsed, information about correlation among constituent elements of a program is acquired.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), a Master Guide Table (MGT), and the like.

The VCT transmits information about a virtual channel, for example, channel information for selecting a channel and information about a packet identifier (PID) for receiving audio and/or video data. That is, when the VCT is parsed, a channel name, a channel number, and the PID of the audio and video data of a broadcast program carried in the channel can be known. The STT transmits current date and time information, and the RRT transmits information about a region and an organ of consultation for a program rating level. The ETT transmits an additional description about a channel and a broadcast program, and the EIT transmits information about an event of a virtual channel. The DCCT/DCCSCT transmits information about an automatic channel change, and the MGT transmits version- and PID-information of individual tables contained in the PSIP.

According to one embodiment of the present invention, the present invention may be applied to a Digital Video Broadcasting (DVB) system which is a European broadcast standard.

Service information of the DVB system includes a Network Information Table (NIT), a Bouquet Association Table (BAT), a Service Description Table (SDT), an Event Information Table (EIT), a Time and Date Table (TDT), a Time Offset Table (TOT), a Running Status Table (RST), and/or a Stuffing Table (ST).

Signaling information according to one embodiment of the present invention may include any one of the tables included in the service information of the DVB system described above. Which one of the tables included in the service information of the DVB system described above includes the signaling information according to the embodiment of the present invention may be determined giving priority to increasing the processing efficiency of the system.

The NIT conveys information relating to the physical organization of the multiplexes/TSs carried via a given network, and the characteristics of the network itself.

The BAT provides information regarding bouquets. A bouquet is a collection of services, which may traverse the boundary of a network.

Each sub_table of the SDT shall describe services that are contained within a particular TS. The services may be part of the actual TS or part of other TSs, these being identified by means of the table_id.

The EIT provides information in chronological order regarding the events contained within each service.

The TDT carries only the UTC-time and date information.

The TOT carries the UTC-time and date information and local time offset.

The RST allows accurate and rapid updating of the timing status of one or more events. This may be necessary when an event starts early or late due to scheduling changes. The use of a separate table enables fast updating mechanism to be achieved.

The purpose of this clause is to invalidate existing sections at a delivery system boundary e.g. at a cable head-end.

FIG. 1 illustrates elements for configuring a 3D video stream according to an embodiment of the present invention.

The elements for configuring a 3D video stream according to the embodiment of the present invention may include a 2D video stream, a depth stream, an occlusion stream, and/or a transparency stream.

The 3D video stream includes video data for a 2D image. In one embodiment, the 2D video stream may be a broadcast stream having compatibility with a 2D receiver (or a legacy receiver). That is, even when a 3D video stream according to the embodiment of the present invention is transmitted to provide a 3D broadcast service, the 2D receiver may receive or identify only a 2D video stream and decode and display the 2D video stream. In another embodiment, even when the receiver is a 3D receiver, the receiver may provide a 2D video image using only a 2D video stream if the viewer desires to view a 2D video image depending on viewing environments or depending on viewer selection.

The depth stream includes depth information for configuring a 3D video image. The depth information may be defined as a series of information for rendering a 2D video image as a 3D video image. In one embodiment, the depth information may include depth range information, disparity information, object depth information, and/or region depth information.

The depth range information indicates a range of depths within which the depth for representing the 3D effect varies in a procedure in which a specific broadcast service or content is provided.

The disparity information indicates the difference between the locations of a specific point on left and right views (left-eye and right-eye images). A left view perceived by the left eye and a right view perceived by the right eye are required to configure a 3D image. An object such as an image or a subtitle may be present in each of the left and right views. Even a single image or subtitle may be located at different positions in the left and right views. The disparity information indicates such a positional difference.

The object depth information indicates the depth of an object included in a 3D image.

The region depth information indicates the depth of a region included in a 3D image.

The occlusion stream includes data and/or information for processing an occlusion that occurs in a procedure in which a 2D video frame is rendered as a 3D video frame.

For example, in a procedure in which a 2D image including an object and a background image is rendered as a 3D image, a portion may need to be newly viewed between the object and the background. This portion may be referred to as an occlusion region. Since an image for the occlusion region is not included in the 2D image, the image may be predicted and rendered as a 3D image. However, a 3D image created through prediction is not desirable in terms of the quality of the 3D effect.

In order to improve the quality of the 3D effect, the occlusion stream may include image data for the occlusion region. Accordingly, the image data for the occlusion region may be used to create an occlusion region in the procedure in which a 2D image is rendered as a 3D image.

In addition, the occlusion stream may include additional information for processing the occlusion region. For example, the occlusion stream may include depth information for the occlusion region. Alternatively, the occlusion stream may include information of the coordinates of the occlusion region on a screen.

The transparency stream may include data and/or information for processing a transparency issue that occurs in a procedure for rendering a 2D video frame as a 3D video frame.

For example, in a procedure in which a 2D image including a transparent object and a background image of the object is rendered as a 3D image, it may be difficult to determine whether the transparent object is located in front of or behind the background image if the transparency of the transparent object cannot be properly represented (or expressed).

In order to overcome this problem, the transparency stream may include transparency information and/or depth information of a specific object.

According to the embodiment of the present invention, there is an advantage in that it is possible to implement a 3D image having a high-quality 3D effect while maintaining compatibility with a 2D receiver.

Figure 2:
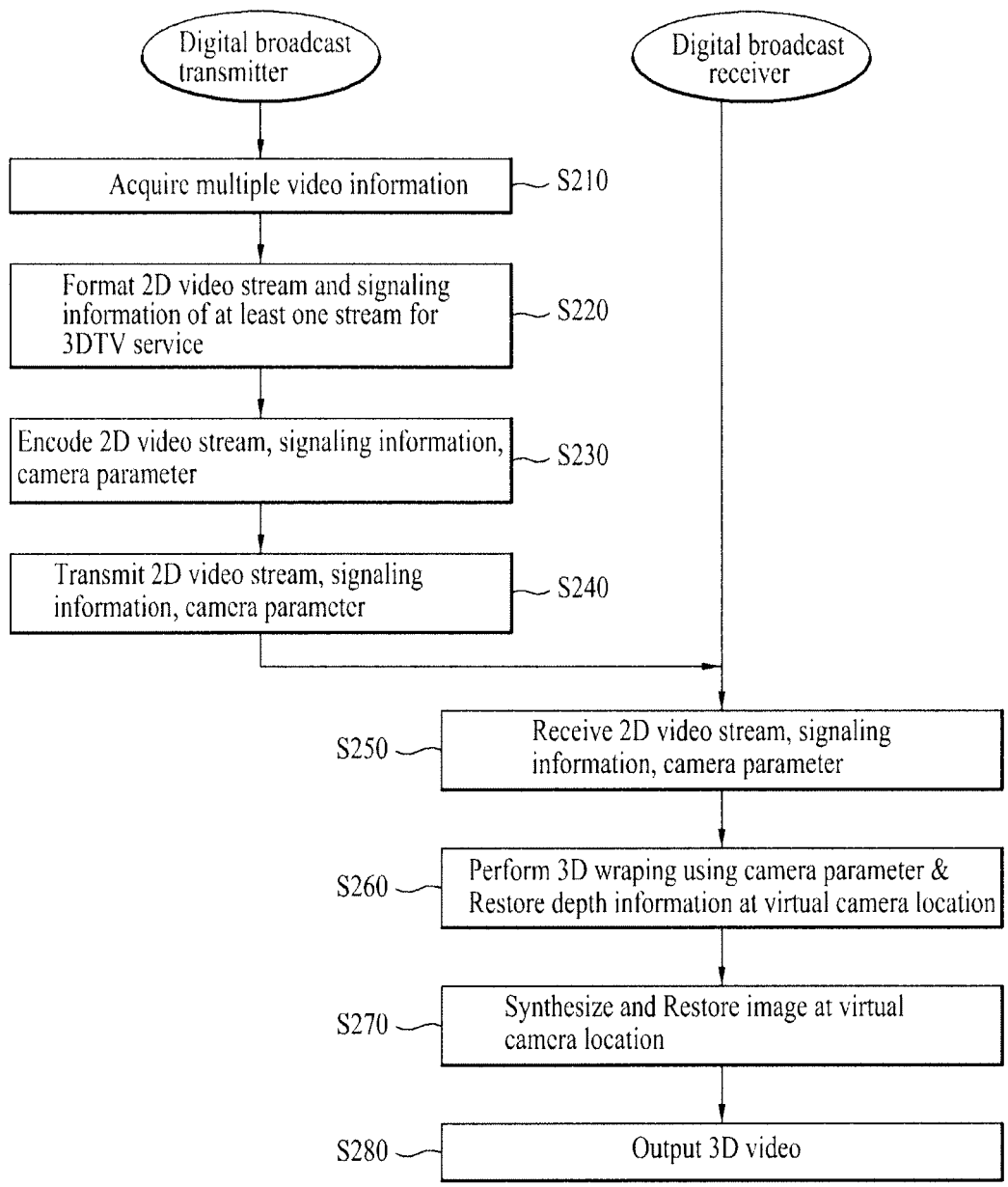
FIG. 2 is a flowchart illustrating a method for controlling a digital broadcast transmitter and a digital broadcast receiver for providing a 3DTV service when a digital broadcast transmitter transmits a camera parameter according to an embodiment of the present invention.

FIG. 2 is a flowchart illustrating a method for controlling a digital broadcast transmitter and a digital broadcast receiver for providing a 3DTV service when a digital broadcast transmitter transmits a camera parameter according to an embodiment of the present invention.

A method for allowing a digital broadcast transmitter to transmit a video signal including a camera parameter and a method for allowing a digital broadcast receiver to generate and restore video data (or image data) on the basis of the camera parameter will hereinafter be described with reference to FIG. 2.

The digital broadcast transmitter captures video data using several cameras (e.g., a pair of stereoscopic cameras), and acquires multiple video information at step S210. At least one of several cameras may be a real camera, and each of the remaining cameras may be a virtual camera. In this case, the real camera may be a camera that transmits a stream of a captured image to a digital broadcast receiver. The virtual camera means a camera that transmits a camera parameter to the digital broadcast receiver, such that a video stream is not transmitted to the digital broadcast receiver and the digital broadcast receiver can restore the corresponding stream. The above-mentioned virtual camera may not be actually present, but the following camera parameter for the virtual camera may be optionally decided by a broadcast program producer or engineer.

In correspondence with each of real cameras, a camera (called a depth camera) for obtaining depth information (or range information) associated with each primary viewpoint contained in an image is arranged so that a digital broadcast receiver can simultaneously obtain the image (or video information) and the depth information. Moreover, the digital broadcast transmitter may extract additional information to be transmitted to the digital broadcast receiver from the image captured by the camera. The additional information may include specific information to estimate a blind part covered by a front object. For example, the specific information may include geometrical information such as an object outline, object transparency information, color information, etc. In accordance with the embodiment of the present invention, the additional information may be acquired from the real camera. However, in accordance with any modified embodiment, the additional information may be acquired from either an image captured by the virtual camera or a combination of an image captured by the real camera and an image captured by the virtual camera. Depth information and/or additional information may not be always needed, and the depth and/or additional information may be optionally extracted and transmitted when the digital broadcast receiver generates a virtual image.

At step S220, the digital broadcast transmitter formats not only a 2D video stream but also signaling information of at least one stream for the 3DTV service using multiple video information captured by the camera. In other words, the digital broadcast transmitter may multiplex a video signal in the form of the above image and a combination of depth information and additional information.

The digital broadcast transmitter encodes the formatted 2D video stream, signaling information of at least one stream for the 3DTV service, and a camera parameter at step S230. The digital broadcast transmitter transmits the encoded 2D video stream, the signaling information of at least one stream for the 3DTV service, and the camera parameter at step S240.

However, although Steps S220, S230 and S240 have been illustrated in FIG. 2 to process the 2D video stream, the signaling information, the camera parameter, etc., it can be that a depth stream, an occlusion stream, and a transparency stream corresponding to the signaling information may be additionally processed so that the processed result may be transmitted to the digital broadcast receiver.

If the digital broadcast receiver receives a 2D video stream, signaling information, and the camera parameter at step S250, the digital broadcast receiver recovers an image according to the 2D video stream and the signaling information. In accordance with another embodiment of the present invention, the depth stream, the occlusion stream, and the transparency stream corresponding to the signaling information may be additionally received at the digital broadcast receiver.

First, the digital broadcast receiver performs 3D warping using the camera parameter, and restores depth information at the location of the virtual camera at step S260. Subsequently, the digital broadcast receiver may synthesize and restore the image acquired at the virtual camera location according to the 3D format at step S270. The digital broadcast receiver outputs 3D video data at step S880. The 3D video data may be stereoscopic video data or the like.

Figure 3:
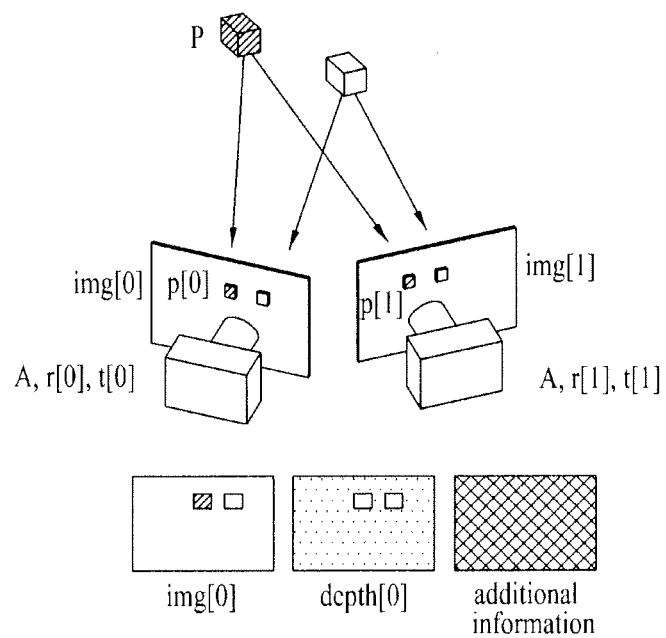
FIG. 3 is a conceptual diagram illustrating some parts of the digital broadcast transmitter operations shown in FIG. 3 according to an embodiment of the present invention.

FIG. 3 is a conceptual diagram illustrating some parts of the digital broadcast transmitter operations shown in FIG. 3 according to an embodiment of the present invention.

Figure 4:
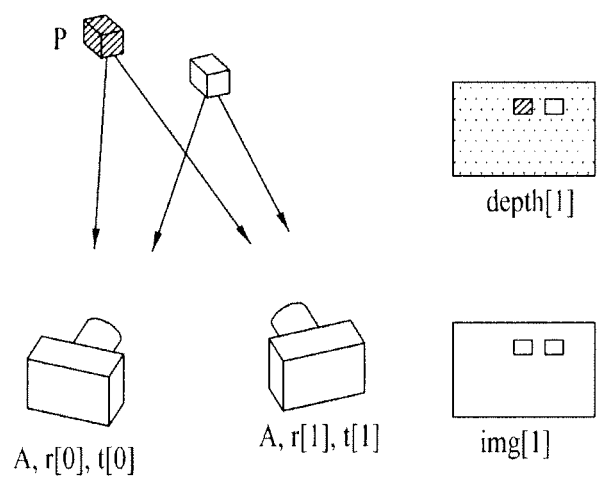
FIG. 4 is a conceptual diagram illustrating some parts of the digital broadcast receiver operations according to an embodiment of the present invention.

FIG. 4 is a conceptual diagram illustrating some parts of the digital broadcast receiver operations according to an embodiment of the present invention.

Referring to FIGS. 3 and 4, the digital broadcast transmitter may transmit the encoded video information, the encoded depth information, and the encoded additional information, and the digital broadcast receiver may decode the video information, the depth information, and the additional information, such that an objective image can be generated and restored, and as such a detailed description thereof will hereinafter be described in detail.

As can be seen from FIG. 3, for convenience of descriptor and better understanding of the present invention, one real camera and one virtual camera are shown in FIG. 3. However, the number of real cameras and the number of virtual cameras are disclosed only for illustrative purposes, and it is apparent to those skilled in the art that more real cameras and more virtual cameras may also be installed as necessary.

In FIG. 3, it is assumed that an image captured by the real camera is 'img[0]' and an image captured or capturable by the virtual camera is 'img[1]'. It is assumed that a point corresponding to the point P in a 3D real world on the image img[0] is denoted by p[0], and a point corresponding to the point P on the image img[1] is denoted by p[1]. The camera parameter may be classified into an intrinsic camera parameter and an extrinsic camera parameter. The intrinsic camera parameter may indicate optical characteristics of a camera lens, such as a focal length and a principal point, and unique characteristics of a camera, such as a skew factor. The extrinsic camera parameter may indicate geometrical-location and direction of the real camera or the virtual camera, and may include a translation and the amount of rotation, etc. of each reference coordinate system with respect to a reference coordinate system of the real world. In the example of FIG. 3, it is assumed that the intrinsic camera parameter of a first camera (i.e., the real camera) is denoted by 'A'. If it is assumed that a second camera (i.e., the virtual camera) is the same kind as the first camera and is sufficiently calibrated with the first camera, the intrinsic camera parameter of the second camera is also set to 'A' in the same manner as in the first camera. It is assumed that the amount of rotation of the first camera is denoted by r[0] and the translation of the first camera is denoted by t[0]. The amount of rotation of the second camera is denoted by r[1] and the translation of the second camera is denoted by t[1].

In accordance with the embodiment of the present invention, depth information and image information are transmitted to the digital broadcast receiver of each of all real cameras. In addition, the additional information is configured on the basis of one image, and is then transmitted to the digital broadcast receiver. Therefore, in the example of FIG. 3 including one real camera and one virtual camera, the image img[0] and depth information depth[0] of the first camera acting as the real camera are transmitted to the digital broadcast receiver. In addition, the additional information is further transmitted to the digital broadcast receiver so that the image img[1] and the depth information depth[1] of the second camera can be used in the digital broadcast receiver.

The digital broadcast receiver decodes the encoded video signal, and restores the image img[0], the depth information depth[0], and the additional information for the first camera acting as the real camera. In addition, the digital broadcast receiver restores camera parameters A, r[0], t[0], r[1], and t[1] for all cameras during the decoding process. Referring to FIG. 10, the digital broadcast receiver generates depth information 'depth[1]' at the location of the second camera using the camera parameters A, r[0], t[0], r[1], and t[1], the image img[0] and the depth information 'depth[0]' of the first camera, and the additional information. Subsequently, the digital broadcast receiver performs 3D warping so that the image img[1] of the location of the second virtual camera is generated. In this way, the image img[0] captured by the first camera and the image img[1] captured by the second camera are obtained, so that the digital broadcast receiver formats two images (i.e., the real image img[0] and the virtual image img[1]) so as to display the 3D image. For example, one of the real image and the virtual image is set to a left view image and the other one is set to a right view image, so that these images are stereoscopically displayed according to a 3D format.

In order to implement the 3DTV service, the additional viewpoint image must be obtained. Specifically, a method for obtaining the additional viewpoint image while the camera parameter is transmitted will hereinafter be described.

One point (i.e., the point P) of a 3D space is mapped to p[0] in the 0-th camera, and is mapped to p[1] in the first camera. The relationship among p[i], s[i], A[i], r[i], and t[i] can be represented by the following equation 1 using the camera parameter transferred from the digital broadcast transmitter.

$$s[i]\begin{bmatrix} p[i] \\ 1 \end{bmatrix} = A[i][r[i]t[i]]\begin{bmatrix} P \\ 1 \end{bmatrix}$$ [Equation 1]

In Equation 1, s[i] is a scaling factor at the i-th camera, A[i] is an intrinsic parameter of the i-th camera, r[i] is a rotation value among extrinsic cameras of the i-th camera, and t[i] is a translation value among extrinsic parameters of the i-th camera.

With respect to the point mapped to the i-th camera, the equation for the point mapped to the 0-th camera can also be represented by the following equation 2.

$$z[i]p[i]=z[0]A[i]r[i]r[0]A[0]^{-1}p[0]-A[i]r[i]r[0]^{-1}t[0]+A[i]t[i]$$ [Equation 2]

In Equation 2, z is a depth value.

If the 3D warping, such as homographic transform, is performed on a corresponding depth map by means of the parameter of the 0-th camera having acquired 2D video data, the depth map of the i-th virtual camera can be obtained. Therefore, the depth value 'z' of Equation 2 can be obtained so that the image value p[i] mapped to the i-th camera can be calculated.

Equation 1 and Equation 2 can be represented by the following equations (3) and (4).

$$s[i]p[i]=A[i]r[i]P+A[i]t[i]$$ [Equation 3]

$$s[0]p[0]=A[0]r[0]P+A[0]t[0]$$ [Equation 4]

Equation (3) can be represented as A[0]r[0]P=s[0]p[0]−A[0]t[0]

Equation [4] can be represented by the following equation (5).

$$P=s[0]r[0]^{-1}A[0]^{-1}p[0]-r[0]^{-1}t[0]$$ [Equation 5]

$$s[i]p[i]=s[0]A[i]r[i]r[0]^{-1}A[0]^{-1}p[0]-A[i]r[i]r[0]^{-1}t[0]+A[i]t[i]$$ [Equation 6]

In Equation (6), if s(i) is replaced with depth, 'z[i]', and is multiplied by each of both sides, the following equation (7) can be acquired.

$$s[i]=s[0]A[i]r[i]r[0]^{-1}A[0]^{-1}p[0]p[i]^{-1}-A[i]r[i]r[0]^{-1}t[0]p[i]^{-1}+A[i]t[i]p[i]^{-1}$$ [Equation 7]

For example, the depth map is a depth image composed of 3D coordinates of each pixel corresponding to one 2D picture. Therefore, each coordinate values of the depth map corresponds to a depth value of the position (x,y) corresponding to the 2D picture. In other words, the depth value can mean a distance from a camera to an object.

In accordance with the application of the above-mentioned method, if the digital broadcast receiver establishes a predetermined virtual camera, i.e., if the digital broadcast receiver establishes a camera parameter, 3D video data (or 3D image) of a new viewpoint can be implemented.

Figure 5:
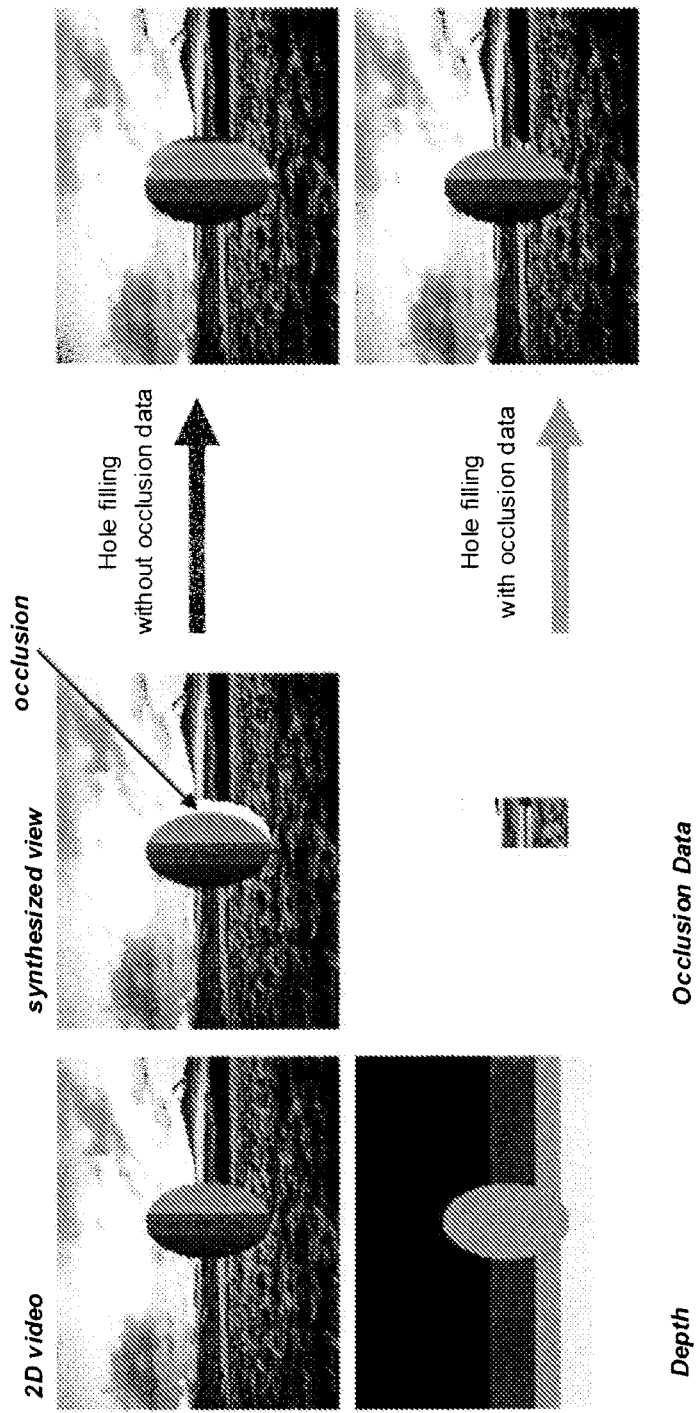
FIG. 5 shows one case having no occlusion data and the other case having occlusion data in a process for implementing a screen image of a 3DTV service according to one embodiment of the present invention.

FIG. 5 shows one case having no occlusion data and the other case having occlusion data in a process for implementing a screen image of a 3DTV service according to one embodiment of the present invention.

As described above, when a new viewpoint image is obtained so as to convert a 2D video signal into a 3D video signal using the depth information, a newly viewed part (i.e., the occlusion area) of the new viewpoint must be hole-filling processed with peripheral values (e.g., pixel values) in a subsequent process. For example, as shown in the upper part of FIG. 5, the hole-filling process may also be applied even to the case having no occlusion data.

However, in the case of transmitting the occlusion information over a transmission channel, a more perfect 3D image can be implemented even at the new viewpoint as shown in the lower part of FIG. 5. In addition, when transmitting transparency information over the transmission channel, a boundary between a background view and a panoramic view can also be more smoothly processed.

Figure 6:
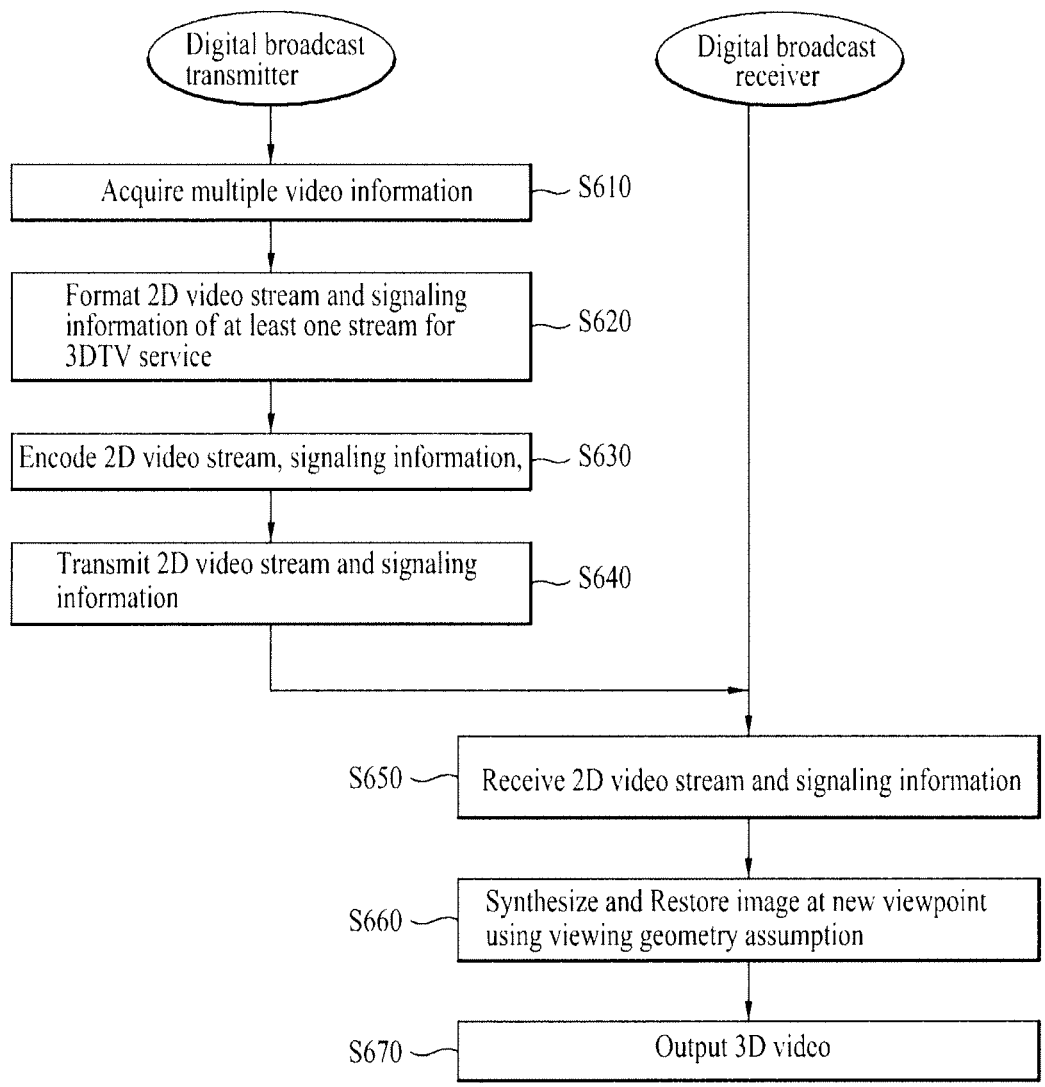
FIG. 6 is a flowchart illustrating a method for controlling a digital broadcast transmitter and a digital broadcast receiver for providing a 3DTV service when the digital broadcast transmitter transmits no camera parameter according to an embodiment of the present invention.

FIG. 6 is a flowchart illustrating a method for controlling a digital broadcast transmitter and a digital broadcast receiver for providing a 3DTV service when the digital broadcast transmitter transmits no camera parameter according to an embodiment of the present invention.

A method for enabling a digital broadcast receiver to generate and restore an image on the condition that the digital broadcast transmitter transmits a video signal having no camera parameter will hereinafter be described with reference to FIG. 6.

Referring to FIG. 6, the digital broadcast transmitter controls several cameras (e.g., a pair of stereoscopic cameras) to capture an image, so that it obtains multiple video information at step S610. At least one of several cameras is a real camera and each of the remaining cameras is a virtual camera. However, the process shown in FIG. 6 may also be interpreted by referring to the method shown in FIG. 2.

At step S620, the digital broadcast transmitter formats not only a 2D video stream but also signaling information of at least one stream for the 3DTV service using multiple video information captured by the cameras.

The digital broadcast transmitter encodes the formatted 2D video stream, signaling information of at least one stream for the 3DTV service, and a camera parameter at step S630. The digital broadcast transmitter transmits the encoded 2D video stream and the signaling information of at least one stream for the 3DTV service at step S640.

However, although Steps S620, S630 and S640 have been illustrated in FIG. 6 to process the 2D video stream, the signaling information, etc., it can be that a depth stream, an occlusion stream, and a transparency stream corresponding to the signaling information may be additionally processed so that the processed result may be transmitted to the digital broadcast receiver.

If the digital broadcast receiver receives a 2D video stream and signaling information at step S650, the digital broadcast receiver may recover an image according to the 2D video stream and the signaling information. In accordance with another embodiment of the present invention, the depth stream, the occlusion stream, and the transparency stream corresponding to the signaling information may also be additionally received at the digital broadcast receiver.

First, the digital broadcast receiver may synthesize and restore a new viewpoint image using the assumption of viewing geometry at step S660. Furthermore, the digital broadcast receiver outputs 3D video data at step S670. The 3D video data may be stereoscopic video data or the like.

Figure 7:
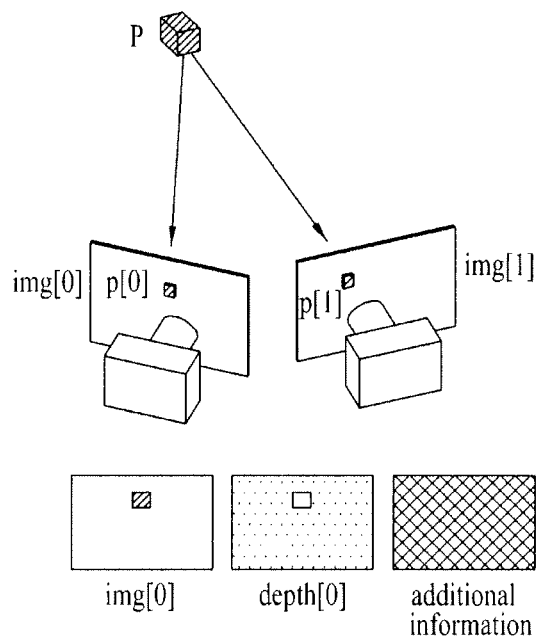
FIG. 7 is a conceptual diagram illustrating some operations of the digital broadcast transmitter according to an embodiment of the present invention.

FIG. 7 is a conceptual diagram illustrating some operations of the digital broadcast transmitter according to an embodiment of the present invention.

Figure 8:
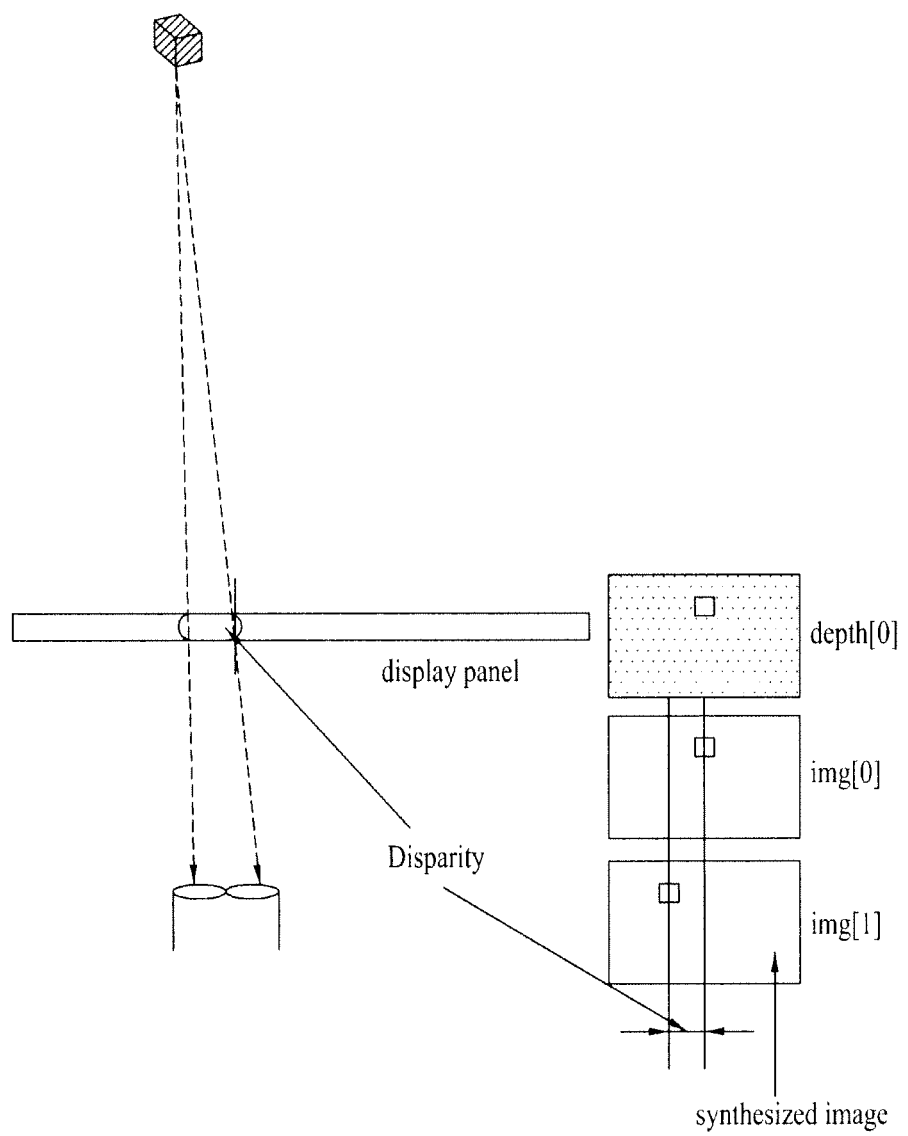
FIG. 8 is a conceptual diagram illustrating some operations of the digital broadcast receiver according to an embodiment of the present invention.

FIG. 8 is a conceptual diagram illustrating some operations of the digital broadcast receiver according to an embodiment of the present invention.

Referring to FIG. 7, if camera parameters (e.g., A, r, t, etc.) are not transmitted in a different way from FIG. 3, it is impossible to calculate a new viewpoint for synthesizing the 3D image using such camera parameters as shown in FIG. 4. In this case, it is necessary to calculate the new viewpoint using the assumption of view geometry.

Figure 9:
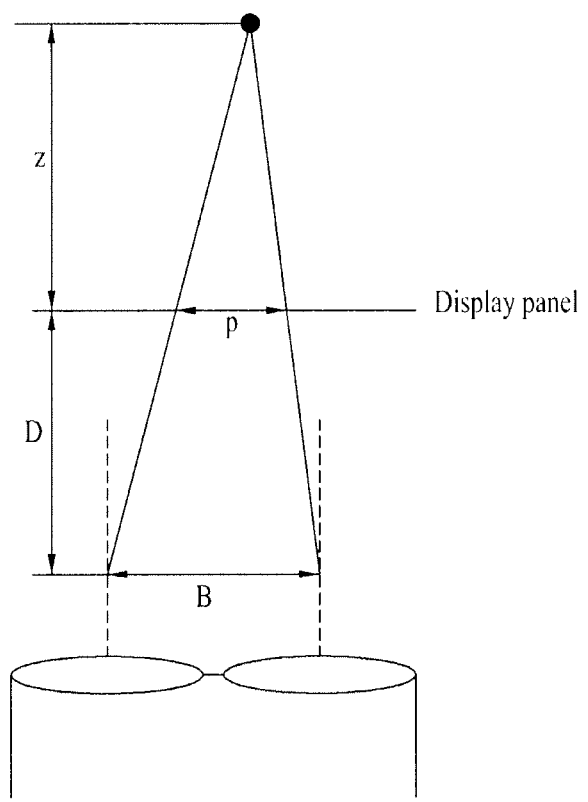
FIG. 9 is a conceptual diagram illustrating a method for acquiring an additional viewpoint image needed for the 3DTV service using the assumption of viewing geometry when the digital broadcast transmitter transmits no camera parameter.

FIG. 9 is a conceptual diagram illustrating a method for acquiring an additional viewpoint image needed for the 3DTV service using the assumption of viewing geometry when the digital broadcast transmitter transmits no camera parameter.

In FIG. 9, B is a distance between right and left eyes, and D is a distance between a display panel and the human being. If a predetermined average value is substituted into each of the distance values, the disparity (p) can be calculated using the principle of trigonometry as shown in FIG. 9. The distance (z) indicating the distance from a new viewpoint to the display panel so as to implement the 3D image can be calculated using the depth map.

Therefore, in association with each pixel of the 2D video data, the distance (z) can be calculated on the basis of the depth value corresponding to each pixel of the depth map. In addition, the disparity (p) may be calculated by the following equation 8, and the pixel position can be shifted by the disparity (p). If the above-mentioned processes are carried out on all pixels of 2D video data, a new 3D synthesized image can be implemented.

$$\frac{z}{p} = \frac{z+D}{B} \Rightarrow p = \frac{Bz}{z+D} \qquad \text{[Equation 8]}$$

As described above, when a new viewpoint image is obtained so as to convert a 2D video signal into a 3D video signal using the depth information, a newly viewed part (i.e., the occlusion area) of the new viewpoint must be hole-filling processed with peripheral values (e.g., pixel values) in a subsequent process.

However, in the case of transmitting the occlusion information over a transmission channel, a more perfect 3D image can be implemented even at the new viewpoint as shown in the lower part of FIG. 5. In addition, when transmitting transparency information over the transmission channel, a boundary between a background view and a panoramic view can also be more smoothly processed.

FIG. 10 shows a 3D service location descriptor according to one embodiment of the present invention. The descriptor shown in FIG. 10 is present in the Virtual Channel Table (VCT), and performs signaling of information of 3D components constructing a corresponding virtual channel.

The 3D service location descriptor includes a 'PCR_PID' field, a 'number_elements' field, a 'data_type' field, an 'elementary_PID' field, a 'codec_type' field, a bit_depth_minus_1' field, a 'same_resolution_flag' field, a 'horizontal_size' field and/or a 'vertical_size' field A 'PCR_PID' field is a 13-bit field indicating the PID of Transport Stream (TS) packets which shall contain a PCR field valid for a program specified by a 'program_number' field.

A 'number_elements' field indicates the number of elements corresponding to the VCT. For example, the aforementioned elements may indicate elements for 3DTV services.

A 'data_type' field indicates whether the above-mentioned elements are associated with depth data, occlusion data, or transparency data.

An 'elementary_PID' field is a 13-bit field specifying the PID of Transport Stream (TS) packets which carry an associated program element.

A 'codec_type' field identifies the encoding type of the above-mentioned elements. For example, the encoding type may be the MPEG-2 video, the H.264/Advanced Video Coding (AVC) video, or the like.

In accordance with the 'bit_depth_minus_1' field, if the value of 1 is added to the 'bit_depth_minus_1' field, this added result means the number of bits used for representing each pixel. For example, the number of bits may be set to 8, 10, or the like, so that the bits may be 8-bits, 10-bits, or the like.

A 'same_resolution_flag' field indicates whether or not the resolution of each element associated with the 3DTV service is identical to the resolution of the 2D video. If the resolution of each element associated with the 3DTV service is different from the resolution of the 2D video, the 'same_resolution_flag' field indicates a horizontal size and a vertical size of the resolution using the 'horizontal_size' field and the 'vertical_size' field.

FIG. 11 illustrates locations wherein the TVCT and the above-described descriptors can be included according to an embodiment of the present invention.

The value of the table_id field indicates the type of table section being defined here. For the terrestrial_virtual_channel_table_section( ), the table_id shall be 0xC8.

section_syntax_indicator field is a one-bit field which shall be set to '1' for the terrestrial_virtual_channel_table_section( ).

private_indicator field shall be set to '1'.

section_length field is a twelve bit field, the first two bits of which shall be '00'. It specifies the number of bytes of the section, starting immediately following the section_length field, and including the CRC. The value in this field shall not exceed 1021.

transport_stream_id field, the 16-bit MPEG-2 Transport Stream ID, as it appears in the Program Association Table (PAT) identified by a PID value of zero for this multiplex. The transport_stream_id distinguishes this Terrestrial Virtual Channel Table from others that may be broadcast in different PTCs.

version_number field is the version number of the Virtual Channel Table. For the current VCT (current_next_indicator='1'), the version number shall be incremented by 1 whenever the definition of the current VCT changes. Upon reaching the value 31, it wraps around to 0. For the next VCT (current_next_indicator='0'), the version number shall be one unit more than that of the current VCT (also in modulo 32 arithmetic). In any case, the value of the version_number shall be identical to that of the corresponding entries in the MGT.

current_next_indicator field, a one-bit indicator, which when set to '1' indicates that the Virtual Channel Table sent is currently applicable. When the bit is set to '0', it indicates that the table sent is not yet applicable and shall be the next table to become valid. This standard imposes no requirement that "next" tables (those with current_next_indicator set to '0') must be sent. An update to the currently applicable table shall be signaled by incrementing the version_number field.

section_number field gives the number of this section. The section_number of the first section in the Terrestrial Virtual Channel Table shall be 0x00. It shall be incremented by one with each additional section in the Terrestrial Virtual Channel Table.

last_section_number specifies the number of the last section (that is, the section with the highest section_number) of the complete Terrestrial Virtual Channel Table.

protocol_version field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

num_channels_in_section field specifies the number of virtual channels in this VCT section. The number is limited by the section length.

short_name field specifies the name of the virtual channel.

major_channel_number field, a 10-bit number that represents the "major" channel number associated with the virtual channel being defined in this iteration of the "for" loop. Each virtual channel shall be associated with a major and a minor channel number. The major channel number, along with the minor_channel_number, act as the user's reference number for the virtual channel. The major_channel_number shall be between 1 and 99. The value of major_channel_number shall be set such that in no case is a major_channel_number/minor_channel_number pair duplicated within the TVCT.

minor_channel_number field, a 10-bit number in the range 0 to 999 that represents the "minor" or "sub"-channel number. This field, together with major_channel_number, performs as a two-part channel number, where minor_channel_number represents the second or right-hand part of the number. When the service_type is analog television, minor_channel_number shall be set to 0. Services whose service_type is either ATSC_digital_television or ATSC_audio_only shall use minor numbers between 1 and 99. The value of minor_channel_number shall be set such that in no case is a major_channel_number/minor_channel_number pair duplicated within the TVCT. For other types of services, such as data broadcasting, valid minor virtual channel numbers are between 1 and 999.

modulation_mode field indicates the modulation mode for the transmitted carrier associated with this virtual channel.

The value of the carrier_frequency field is zero. Use of this field to identify carrier frequency is allowed, but is deprecated.

channel_TSID field in the range 0x0000 to 0xFFFF that represents the MPEG-2 Transport Stream ID associated with the Transport Stream carrying the MPEG-2 program referenced by this virtual channel 8. For inactive channels, channel_TSID shall represent the ID of the Transport Stream that will carry the service when it becomes active. The receiver is expected to use the channel_TSID to verify that any received Transport Stream is actually the desired multiplex. For analog channels (service_type 0x01), channel_TSID shall indicate the value of the analog TSID included in the VBI of the NTSC signal.

program_number field that associates the virtual channel being defined here with the MPEG-2 PROGRAM ASSOCIATION and TS PROGRAM MAP tables. For virtual channels representing analog services, a value of 0xFFFF shall be specified for program_number.

ETM_location field specifies the existence and the location of an Extended Text Message (ETM).

access_controlled field, a 1-bit Boolean flag that indicates, when set, that the events associated with this virtual channel may be access controlled. When the flag is set to '0', event access is not restricted.

hidden field, a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

hide_guide field, a Boolean flag that indicates, when set to '0' for a hidden channel, that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.

service_type field that shall identify the type of service carried in this virtual channel.

source_id field identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.

descriptors_length field specifies total length (in bytes) of the descriptors for this virtual channel that follows.

Zero or more descriptors, as appropriate, may be included in descriptor( )

additional_descriptors_length field specifies total length (in bytes) of the VCT descriptor list that follows.

CRC_32 field contains the CRC value that ensures a zero output from the registers in the decoder.

According to an embodiment of the present invention, it is possible to identify a 3D broadcast service through the service_type field. For example, the service_type field may be defined such that it indicates that a virtual channel transmits a broadcast signal for a 3D broadcast when the value of the service_type field is "0x10".

Among the above-described descriptors, the 3D service location descriptor may be included in a for loop configured for descriptors following the descriptors_length field, thereby being signaled.

The following is a description of a method for receiving and processing a 3D service location descriptor through a TVCT according to an embodiment of the present invention.

The receiver determines whether or not the virtual channel provides a 3DTV service using the service_type field of the TVCT.

In the case where the virtual channel provides a 3DTV service, the receiver receives elementary_PID information of a 3D video using the service location descriptor. For example, the elementary_PID information of the 2D video may be referred to as a PID_V.

The receiver may read the 3D_service_location_descriptor and then may identify the corresponding component as one of the depth, occlusion, and transparency components according to the data_type. The receiver acquires elementary_PID information of the corresponding component. For example, the elementary_PID information of the depth component may be referred to as PID_D, the elementary_PID information of the occlusion component may be referred to as PID_O, and the elementary_PID information of the transparency component may be referred to as PID_T. Here, the receiver may not receive all the three components, the depth, occlusion, and transparency components. For example, the depth component may be received while the occlusion and transparency components may be optionally received. The receiver may determine the availability of the component based on the signaled data_type.

The receiver determines information such as coding type and/or bit depth of each 3D component using the 3D service location descriptor.

The receiver demultiplexes a stream corresponding to the PID_V so as to be processed by the video decoder. After demultiplexing, the corresponding PES/ES may be processed by the video decoder.

The receiver transfers streams corresponding to the PID_D, the PID_O, and the PID_T to respective decoders that process the corresponding data (depth, occlusion, and transparency).

The receiver processes the depth/occlusion/transparency information together with a corresponding 2D video frame to render or format a 3D video.

FIG. 12 illustrates a 3D service location descriptor according to another embodiment of the present invention.

The 3D service location descriptor according to this embodiment of the present invention may be transmitted while being included in a Program Map Table (PMT).

Since each field that may be included in the 3D service location descriptor may include information similar to a field having the same name shown in FIG. 10, a description of the fields that may be included in the 3D service location descriptor is replaced with the above description of FIG. 10.

FIG. 13 illustrates a location of a PMT and locations wherein the above-described descriptor can be included within the PMT according to an embodiment of the present invention.

table_id field is an 8-bit field, which in the case of a TS_program_map_section shall be always set to 0x02.

section_syntax_indicator field is a 1-bit field which shall be set to '1'.

section_length field is a 12-bit field, the first two bits of which shall be '00'. The remaining 10 bits specify the number of bytes of the section starting immediately following the section_length field, and including the CRC. The value in this field shall not exceed 1021 (0x3FD).

program_number field is a 16-bit field. It specifies the program to which the program_map_PID is applicable. One program definition shall be carried within only one TS_program_map_section. This implies that a program definition is never longer than 1016 (0x3F8). The program_number may be used as a designation for a broadcast channel, for example. By describing the different program elements belonging to a program, data from different sources (e.g. sequential events) can be concatenated together to form a continuous set of streams using a program_number.

version_number field is the version number of the TS_program_map_section. The version number shall be incremented by 1 modulo 32 when a change in the information carried within the section occurs. Version number refers to the definition of a single program, and therefore to a single section. When the current_next_indicator is set to '1', then the version_number shall be that of the currently applicable TS_program_map_section. When the current_next_indicator is set to '0', then the version_number shall be that of the next applicable TS_program_map_section.

current_next_indicator field, which when set to '1' indicates that the TS_program_map_section sent is currently applicable. When the bit is set to '0', it indicates that the TS_program_map_section sent is not yet applicable and shall be the next TS_program_map_section to become valid.

The value of the section_number field shall be 0x00.

The value of the last section_number field shall be 0x00.

PCR_PID field is a 13-bit field indicating the PID of the Transport Stream packets which shall contain the PCR fields valid for the program specified by program_number. If no PCR is associated with a program definition for private streams, then this field shall take the value of 0x1FFF.

program_info_length field is a 12-bit field, the first two bits of which shall be '00'. The remaining 10 bits specify the number of bytes of the descriptors immediately following the program_info_length field.

stream_type field is an 8-bit field specifying the type of program element carried within the packets with the PID whose value is specified by the elementary_PID.

elementary_PID field is a 13-bit field specifying the PID of the Transport Stream packets which carry the associated program element.

ES_info_length field is a 12-bit field, the first two bits of which shall be '00'. The remaining 10 bits specify the number of bytes of the descriptors of the associated program element immediately following the ES_info_length field.

CRC_32 field is a 32-bit field that contains the CRC value that gives a zero output of the registers in the decoder.

Among the above-described descriptors, the 3D service location descriptor may be included in a for loop configured for descriptors following the ES_info_length field, thereby being signaled.

The stream_type field included in the PMT may perform a function similar to the data_type field of the 3D service location descriptor shown in FIG. 10. That is, the stream_type field included in the PMT may indicate whether the transmitted element is a depth stream, an occlusion stream, or a transparency stream.

The following is a description of a method for receiving a 3D service location descriptor through a PMT according to an embodiment of the present invention.

The receiver determines the data type of the corresponding element using the stream_type of the PMT. For example, the receiver determines whether the received element corresponds to a depth stream, an occlusion stream, or a transparency stream using the stream_type field.

The receiver determines the PID value of each of the depth, occlusion, and transparency elements. For example, the elementary_PID information of the depth element may be referred to as PID_D, the elementary_PID information of the occlusion element may be referred to as PID_O, and the elementary_PID information of the transparency element may be referred to as PID_T. Here, the receiver may not receive all the three elements, the depth, occlusion, and transparency elements. For example, the depth element may be received while the occlusion and transparency elements may be optionally received. The receiver may determine the availability of each of the depth, occlusion, and transparency elements based on the signaled stream_type field information.

The receiver determines information such as coding type and/or bit depth of each 3D component using the 3D service location descriptor according to another embodiment of the present invention.

The receiver performs mapping with information provided through the TVCT using the program_number field. For example, the receiver may identify a virtual channel through which the corresponding 3DTV service is provided.

The receiver demultiplexes a stream corresponding to the PID_V, which is a 2D video stream, so as to be processed by the video decoder. After demultiplexing, the corresponding PES/ES may be processed by the video decoder of the receiver.

The receiver transfers streams corresponding to the PID_D, the PID_O, and/or the PID_T to respective decoders that process the corresponding data (depth, occlusion, and/or transparency).

The receiver processes the depth/occlusion/transparency information together with a corresponding 2D video frame to render or format a 3D video.

FIG. 14 illustrates a 3D service location descriptor according to another embodiment of the present invention.

The 3D service location descriptor according to this embodiment of the present invention may be transmitted while being included in a Service Description Table (SDT).

The 3D service location descriptor according to this embodiment may include a number_elements field, a data_type field, a component_tag field, a codec_type field, a bit_depth_minus_1 field, a same_resolution_flag field, a horizontal_size field, and/or a vertical_size field.

component_tag is a 8-bit field that has the same value as the component_tag field in the stream identifier descriptor (if present in the PSI program map section) for the component stream.

Since the other fields included in the 3D service location descriptor perform functions similar to the fields having the same names described above with reference to FIG. 10, a description of the other fields is replaced with the description of FIG. 10.

The functions of the data_type field and the codec_type field included in the 3D service location descriptor of this embodiment may also be performed by the stream_content field and the component_type field included in the SDT. In this case, the data_type field and the codec_type field may not be included in the 3D service location descriptor.

According to an embodiment of the present invention, a component_tag field may be used to indicate the association between the ES of the ES_loop of the PMT and the component descriptor. For example, the component_tag field in the stream identifier descriptor which is an ES_loop descriptor of the PMT may have the same value as the component_tag field in the 3D service location descriptor and/or the component descriptor to indicate the association between the 3D service location descriptor and the component descriptor in the SDT.

Although the 3D service location descriptor includes information of a plurality of elements through a loop in the embodiment of the present invention shown in FIG. 14, it is also possible to configure a 3D service location descriptor which has no loop and thus includes information of only one element.

FIG. 15 illustrates a Service Description Table (SDT) and the location of a 3D service location descriptor in the SDT according to an embodiment of the present invention.

table_id is an 8-bit field identifying this section as belonging to the Service Description Table.

section_syntax_indicator is a 1-bit field which shall be set to "1".

section_length is a 12-bit field, the first two bits of which shall be "00". It specifies the number of bytes of the section, starting immediately following the section_length field and including the CRC. The section_length shall not exceed 1 021 so that the entire section has a maximum length of 1 024 bytes.

transport_stream_id is a 16-bit field which serves as a label for identification of the TS, about which the SDT informs, from any other multiplex within the delivery system.

version_number is a 5-bit field that is the version_number of the sub_table. The version_number shall be incremented by 1 when a change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.

current_next_indicator is an 1-bit indicator, when set to "1" indicates that the sub_table is the currently applicable sub_table. When the bit is set to "0", it indicates that the sub_table sent is not yet applicable and shall be the next sub_table to be valid.

section_number is an 8-bit field giving the number of the section. The section_number of the first section in the sub_table shall be "0x00". The section_number shall be incremented by 1 with each additional section with the same table_id, transport_stream_id, and original_network_id.

last_section_number is an 8-bit field specifying the number of the last section (that is, the section with the highest section_number) of the sub_table of which this section is part.

original_network_id is a 16-bit field giving the label identifying the network_id of the originating delivery system.

service_id is a 16-bit field which serves as a label to identify this service from any other service within the TS. The service_id is the same as the program_number in the corresponding program_map_section.

EIT_schedule_flag is a 1-bit field which when set to "1" indicates that EIT schedule information for the service is present in the current TS. If the flag is set to 0 then the EIT schedule information for the service should not be present in the TS.

EIT_present_following_flag is a 1-bit field which when set to "1" indicates that EIT_present_following information for the service is present in the current TS. If the flag is set to 0 then the EIT present/following information for the service should not be present in the TS.

running_status is a 3-bit field indicating the status of the service.

free_CA_mode is an 1-bit field, when set to "0" indicates that all the component streams of the service are not scrambled. When set to "1" it indicates that access to one or more streams may be controlled by a CA system.

descriptors_loop_length is a 12-bit field gives the total length in bytes of the following descriptors.

CRC_32 is a 32-bit field that contains the CRC value that gives a zero output of the registers in the decoder.

Among the above-described descriptors, the 3D service location descriptor may be included in a for loop configured for descriptors following the descriptors_loop_length field, thereby being signaled.

Through the SDT, it is possible to indicate that a specific service is a 3DTV service. For example, through a service_type field of a service descriptor that may be included in the SDT, it is possible to indicate that a service signaled through the SDT is a 3DTV service.

In another example, a 3D service location descriptor may be included in the SDT to indicate that a specific service is a 3DTV service.

FIG. 16 illustrates the definition of each value of a service_type field according to an embodiment of the present invention.

For example, when the service_type field has a value of "0x12", this may indicate that a service represented by the service description table is a 3D broadcast service.

The respective definitions of the values of the service_type field are illustrated in FIG. 16.

The service_type value may be included in a service descriptor and thus may be included in a descriptor loop of the service description table (SDT).

The following service configuration may be applied to guarantee compatibility with the conventional receiver that supports a 2D service alone.

According to an embodiment of the present invention, a 2D service and a 3D service may be defined while streams that constitute the two services may be shared and used by the two services. In this case, a service type for the 3D service may be used as a new value suggested in the present invention and a 2D stream which constitutes the service is shared by the 2D and 3D services. A 3D broadcast service may be provided by formatting a 3D image using a depth stream, an occlusion stream, and/or a transparency stream.

In another embodiment, a 2D service and a 3D service may be configured as a single service rather than be configured as individual services. In this case, since different values are allocated to depth, occlusion, and/or transparency streams, the conventional 2D receiver cannot identify the depth, occlusion, and/or transparency streams and may thus ignore these streams and provide a full resolution service using a 2D video stream alone. A receiver which supports a 3DTV may identify such 3D data streams (i.e., the depth, occlusion, and/or transparency streams) and provide a 3DTV service by combining the 3D data streams with the 2D video stream.

FIG. 17 illustrates a component descriptor according to an embodiment of the present invention.

The component descriptor according to this embodiment may include a descriptor_tag field, a descriptor_length field, a stream_content field, a component_type field, a component_ tag field, an ISO 639-2 [3]_language_code field, and/or a text_char field.

The descriptor_tag field functions to identify a descriptor to which this field belongs.

The descriptor_length field indicates the length of data which belongs to this descriptor while following this field.

The stream_content field indicates the type of video, audio, or data belonging to the stream.

The component_type field indicates the type of a video, audio, or data component.

The component_tag field is a field having the same value as the component_tag of the stream identifier descriptor.

The ISO 639-2 [3]_language_code field identifies language of the component or language of a character descriptor included in this descriptor.

The text_char field identifies character descriptor text of the component stream.

This descriptor may be included in an Event Information Table (EIT) and/or a Service Description Table (SDT) of the DVB system FIG. 18 illustrates the definitions of stream_content and component_type according to an embodiment of the present invention.

The stream_content indicates the type of the stream. For example, the stream_content may be defined such that the stream_content indicates an MPEG-2 video stream when the value of the stream_content is 0x01 and indicates an H.264 video stream when the value is 0x05. The component type in this stream may be defined as shown in FIG. 18.

In an embodiment of the present invention, the stream_ content and the component_type for identifying the depth, occlusion, and transparency streams which are 3D data streams for a 3DTV service may be defined as shown in FIG. 18.

Conventionally defined values may be used for 2D video without the need to separately define the values for 2D video and component types corresponding respectively to the depth, occlusion, and transparency streams may be additionally defined.

For example, when the stream_content value is "0x01" and the component_type value is "0x13", this may indicate that the stream for a 3D service is a depth stream which has been coded into an MPEG-2 format.

For example, when the stream_content value is "0x01" and the component_type value is "0x14", this may indicate that the stream for a 3D service is an occlusion stream which has been coded into an MPEG-2 format.

For example, when the stream_content value is "0x01" and the component_type value is "0x15", this may indicate that the stream for a 3D service is a transparency stream which has been coded into an MPEG-2 format.

For example, when the stream_content value is "0x05" and the component_type value is "0x13", this may indicate that the stream for a 3D service is a depth stream which has been coded into an H.264/AVC format.

For example, when the stream_content value is "0x05" and the component_type value is "0x14", this may indicate that the stream for a 3D service is an occlusion stream which has been coded into an H.264/AVC format.

For example, when the stream_content value is "0x05" and the component_type value is "0x15", this may indicate that the stream for a 3D service is a transparency stream which has been coded into an H.264/AVC format.

According to an embodiment of the present invention, 3D service location descriptor information may be received through a PMT or through an SDT.

The following is a description of a method for receiving and processing 3D service location descriptor information through a PMT according to an embodiment of the present invention.

The receiver may identify a 2D video stream and a 3D data stream through the SDT and may receive detailed information on each stream through a descriptor included in the PMT.

The receiver determines whether or not a 3DTV service is provided using a service_type field of the service descriptor of the SDT. Alternatively, the receiver may determine whether or not a 3DTV service is provided by checking whether or not a stream for a 3D service is present in a component of an Elementary Stream (ES) signaled through the component descriptor of the SDT.

The receiver determines whether or not a stream corresponding to 2D video is present among elementary streams signaled in the component descriptor of the SDT. Specifically, the receiver may determine whether or not the corresponding ES corresponds to 2D video using the stream_content and the component_type. For example, the corresponding ES may be referred to as a component_Tag_V.

The receiver determines whether or not streams corresponding to 3D data are present among elementary streams signaled in the component descriptor of the SDT. Specifically, the receiver identifies the depth, occlusion, and/or transparency streams. The receiver may determine whether or not the corresponding ES corresponds to a depth, occlusion, or transparency stream of a 3DTV service using the stream_content and component_type. For example, the corresponding ESs may be referred to as a Component_Tag_D, a Component_Tag_O, and a Component_Tag_T, respectively.

The receiver searches for and parses a PMT having a program_number field having the same value as the value of the service_id field of the SDT.

The receiver searches for an elementary stream, in which the value of a component_tag field of a stream identifier descriptor of an ES descriptor loop is a component_Tag_V, among elementary streams of the PMT and receives elementary PID information of the corresponding 2D video component. For example, the elementary PID information of the 2D video component may be referred to as a PID_V.

The receiver searches for elementary streams, in which the values of component_tag fields of stream identifier descriptors of ES descriptor loops are a component_Tag_D, a component_Tag_O, and a component_Tag_T, among elementary streams of the PMT and receives elementary PID information of the corresponding 3D video components. For example, the elementary PID information of the 3D video components may be referred to as a PID_D, a PID_O, and a PID_T, respectively.

The receiver identifies information such as coding type and/or bit depth of each 3D component through a 3D service location descriptor added to the identified PID_V in the ES loop of the PMT.

The receiver demultiplexes a stream corresponding to the PID_V so as to be processed by the video decoder. After demultiplexing, the corresponding PES/ES is processed by the video decoder of the receiver.

The receiver transfers streams corresponding to the PID_D, the PID_O, and/or the PID_T to respective decoders that process the corresponding data (depth, occlusion, and/or transparency).

The receiver processes the depth/occlusion/transparency information together with a corresponding 2D video frame to render or format a 3D video.

In this procedure, the corresponding stream may be identified by checking a stream type of each ES of the PMT as described above. In this case, the depth, occlusion, and/or transparency streams may be identified by checking the stream type of each ES of the PMT without reading the component descriptor of the SDT.

The following is a description of a method for receiving and processing 3D service location descriptor information through an SDT according to an embodiment of the present invention.

The receiver determines whether or not a 3DTV service is provided using a service_type field of the service descriptor of the SDT. Alternatively, the receiver may determine whether or not a 3DTV service is provided by checking whether or not a 3D service location descriptor is present.

In the case where a 3DTV service is provided, the receiver receives component_tag information of a 3D video stream present in the service using the stream_content and component_type values of the component descriptor. For example, the component_tag information of the 2D video stream may be referred to as a component_tag_V.

The receiver reads the 3DTV service location descriptor and identifies the corresponding component as one of the depth, occlusion, and transparency components according to the data_type. The receiver also receives component_tag information of the corresponding components. For example, the component_tag information of the depth, occlusion, and transparency components may be referred to as a component_tag_D, a component_tag_O, and a component_tag_T, respectively. Alternatively, the receiver may identify a depth, occlusion, and/or transparency stream according to the stream_content and content_type values of the component descriptor and receive the respective component_tag values.

The receiver searches for and parses a PMT having a program_number field having the same value as the value of the service_id field of the SDT.

The receiver searches for an elementary stream, in which the value of a component_tag field of a stream identifier descriptor of an ES descriptor loop is a component_Tag_V, among elementary streams of the PMT and receives elementary PID information of the corresponding 2D video component. For example, the elementary PID information of the 2D video component may be referred to as a PID_V.

The receiver searches for elementary streams, in which the values of component_tag fields of stream identifier descriptors of ES descriptor loops are a component_Tag_D, a component_Tag_O, and a component_Tag_T, among elementary streams of the PMT and receives elementary PID information of the corresponding 3D video components. For example, the elementary PID information of the depth, occlusion, and/or transparency components may be referred to as a PID_D, a PID_O, and a PID_T, respectively.

The receiver identifies information such as coding type and/or bit depth of each 3D component through a 3D service location descriptor acquired through the SDT.

The receiver demultiplexes a stream corresponding to the PID_V so as to be processed by the video decoder. After demultiplexing, the corresponding PES/ES is processed by the video decoder of the receiver.

The receiver transfers streams corresponding to the PID_D, the PID_O, and/or the PID_T to respective decoders that process the corresponding data (depth, occlusion, and/or transparency).

The receiver processes the depth/occlusion/transparency information together with a corresponding 2D video frame to render or format a 3D video.

Figure 19:
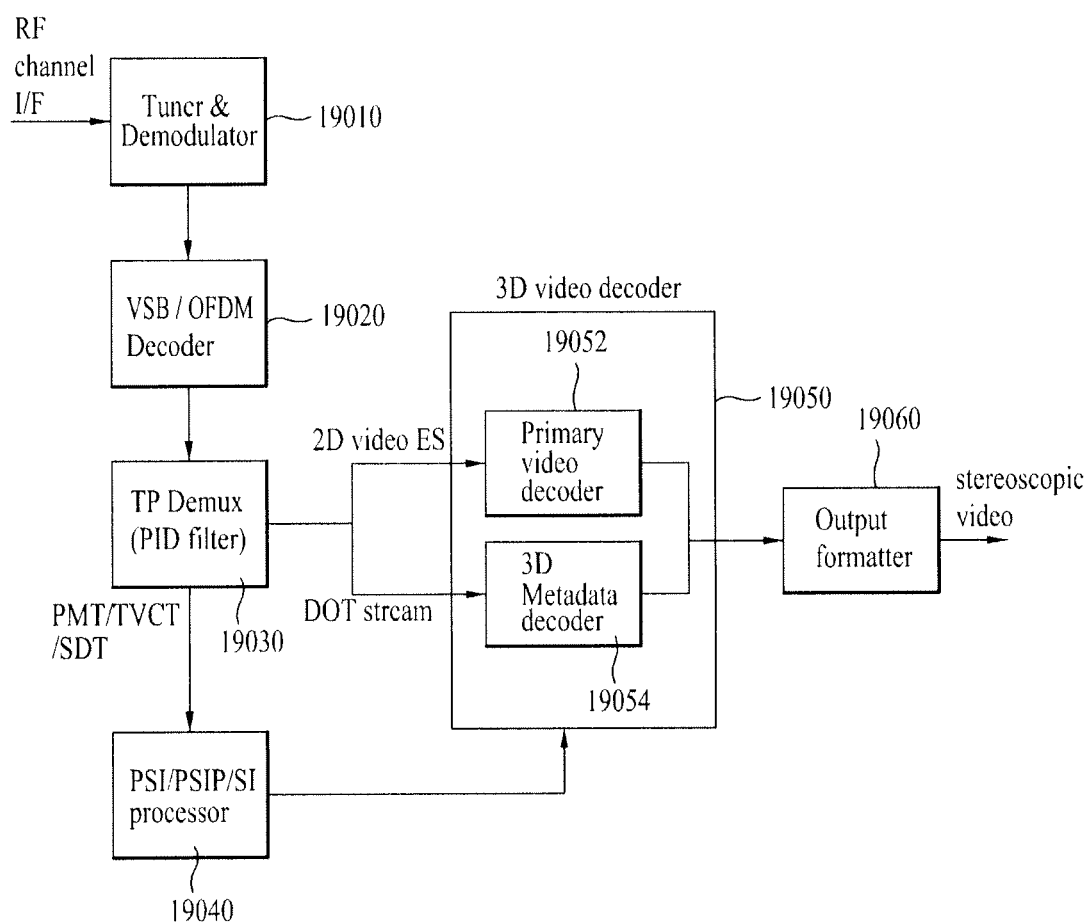
FIG. 19 illustrates a structure of a broadcast receiver according to an embodiment of the present invention.

FIG. 19 illustrates a structure of a broadcast receiver according to an embodiment of the present invention.

The broadcast receiver according to this embodiment may include a tuner & demodulator 19010, a VSB/OFDM decoder 19020, a TP demultiplexer 19030, a system information processor (PSI/PISP/SI processor) 19040, a 3D video decoder 19050, and/or an output formatter 19060. The 3D video decoder 19050 may include a primary video decoder 19052 and/or a 3D metadata decoder 19054.

The broadcast receiver receives a broadcast signal through the tuner & demodulator 19010 and/or the VSB/OFDM decoder 19020.

The TP demultiplexer 19030 extracts video data, system information, and the like from the broadcast signal through filtering and outputs the extracted data and information. The system information may include a PMT, a TVCT, and/or an SDT.

The system information processor 19040 receives system information and parses the system information to acquire signaling information associated with a 3D service. That is, the system information processor 19040 may acquire a 1903D service location descriptor included in the PMT, the TVCT, and/or the SDT. The broadcast receiver determines whether or not a 3D broadcast service is being provided through the system information processor 19040 and allows the TP demultiplexer 19030 to output 2D video data and/or depth, occlusion, and/or transparency streams depending on whether or not a 3D broadcast service is being provided.

The 3D video decoder 19050 decodes the 2D video stream and/or the depth, occlusion, and/or transparency streams according to information included in the PMT, the TVCT, and/or the SDT.

That is, the primary video decoder 19052 decodes the 2D video stream and the 3D metadata decoder 19054 decodes the depth, occlusion, and/or transparency streams.

The output formatter 19060 processes the 2D video stream and/or the depth, occlusion, and/or transparency streams according to 3D related information included in the PMT, the TVCT, and/or the SDT and outputs 3D video data. The output formatter 19060 formats the 2D video stream into a 3D video stream using data of the depth, occlusion, and/or transparency streams.

Figure 20:
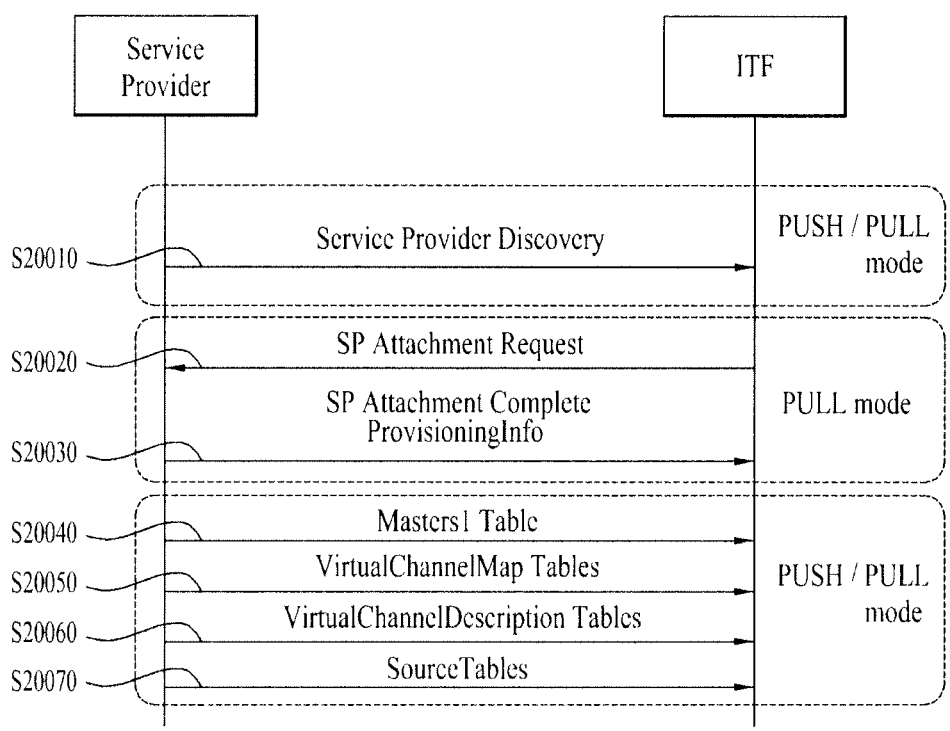
FIG. 20 illustrates a procedure for acquiring a 3D service in an IPTV according to an embodiment of the present invention.

FIG. 20 illustrates a procedure for acquiring a 3D service in an IPTV according to an embodiment of the present invention.

An IPTV Terminal Function (ITF) receives information for service provider discovery from a service provider in a push/pull mode (s20010). The service provider discovery is a procedure in which service providers, which provide IPTV services, search for a server that provides information regarding services of the service providers. For example, the service provider discovery provides a service information server of each service provider in the following manner. That is, the receiver searches for a list of addresses, from which it is possible to receive information regarding a Service Discovery (SD) server (i.e., SP discovery information), in the following manner.

In one embodiment, the receiver receives Service Provider (SP) discovery information from an address that has been automatically or manually preset. Here, the receiver may receive the corresponding information from an address preset in the ITF. Alternatively, a specific address may be set manually by the user to allow the receiver to receive SP discovery information desired by the user.

In another embodiment, the receiver may perform DHCP based SP discovery. That is, the receiver may acquire SP discovery information using a DHCP option.

In another embodiment, the receiver may perform DNS SRV based SP discovery. That is, the receiver may acquire SP discovery information by making a query using a DNS SRV mechanism.

The receiver may access a server located at the address acquired in the above manner and receive information including a service provider discovery record containing information required for service discovery of the Service Provider (SP). The receiver performs a service search process through the information including the service provider discovery record. Data associated with the service provider discovery may be provided in either the push or pull format.

The receiver accesses an SP attachment server of an access address of a service provider (for example, an address specified by an SPAttachmentLocator) based on the information of the SP discovery record and performs an ITF registration process (i.e., a service attachment process) (s20020). Here, the information provided from the ITF to the server may be transmitted, for example, in an ITFRegistrationInputType record format and the ITF may provide such information in a query term format of an HTTP GET method to perform service attachment.

In an embodiment, the receiver may perform service attachment after selectively accessing an authentication service server of the SP specified by the SPAuthenticationLocator and performing a separate authentication process. In this case, the receiver may transmit ITF information of a format similar to that of the service attachment to the server to perform authentication.

The receiver may receive data in a ProvisioningInfoTable format from the service provider (s20030). This process may be omitted.

The receiver provides an ID and location information of the receiver by incorporating the ID and location information into the data such as the ITFRegistrationInputType record which is transmitted to the server in the service attachment process (s20040). The service attachment server may specify a service joined (or subscribed) by the receiver based on the information provided from the receiver. Based on this, the service attachment server may provide an address for acquiring service information, which is to be received by the receiver, in a ProvisioningInfoTable format. For example, this address may be used as access information of a MasterSI table. This method has an advantage in that it is possible to configure and provide a service customized for each subscriber.

The receiver may receive a VirtualChannelMap table (s20050), a VirtualChannelDescription table (s20060), and/or a Source table (s20070) based on the information received from the service provider.

The VirtualChannelMap table provides a list of services in a package format and a master SI table Record that manages the version and access information of the VirtualChannelMap. The VirtualChannelDescription table includes detailed information on each channel. The SourceTable includes access information required to access an actual service. The VirtualChannelMap table, the VirtualChannelDescription table, and the Source table may be classified as service information. This service information may further include descriptor information items described above. However, in this case, the format of the service information may be changed so as to suit the service information scheme of the IPTV.

Figure 21:
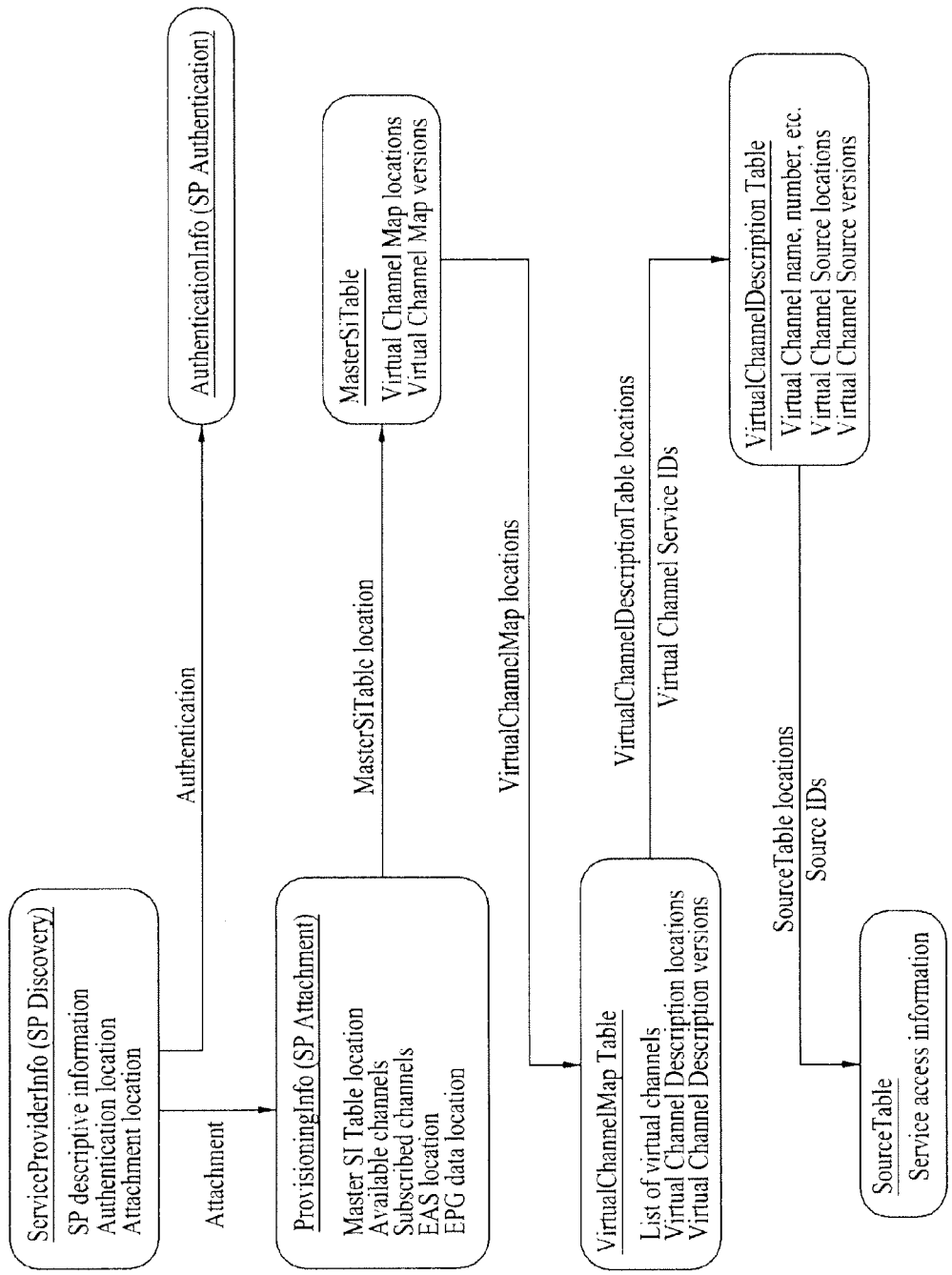
FIG. 21 illustrates a SI (Service Information) table structure for IPTVs according to an embodiment of the present invention.

FIG. 21 illustrates a SI (Service Information) table structure for IPTVs according to an embodiment of the present invention.

Herein, FIG. 21 illustrates Service Provider discovery, attachment metadata components, and Services Discovery metadata components and also illustrates the correlation between the Service Provider discovery, the attachment metadata components, and the Services Discovery metadata components. Herein, the receiver may process the received data by carrying out the process steps along the directions pointed by the arrows shown in FIG. 21.

ServiceProviderinfo includes SP descriptive information, which corresponds to information associated with the service provider, Authentication location information, which corresponds to information on a location that provides the information associated with authentication, and Attachment location information, which corresponds to information associated with an attachment location.

The receiver may use the Authentication location information, so as to perform authentication associated with the service provider.

The receiver may also use information included in the Attachment location, so as to access a server from which the receiver can receive ProvisioningInfo. The ProvisioningInfo may include Master SI Table location information, which includes an address of a server from which a Master SI Table can be received, Available channel information, which includes information on the channels that can be provided to the user, Subscribed channel information, which includes information related to a Subscribed channel, EAS (Emergency Alert System) location information, which includes information related to emergency situation alert, and/or EPG data location information, which includes location information related to an EPG (Electronic Program Guide). Most particularly, the receiver may use the Master SI Table location information, so as to access an address from which the receiver can receive the Master SI Table.

The Master SI Table Record carries information on the location from which the receiver can receive each VirtualChannelMap and also carries information on the version of each VitualChannelMap.

Each VirtualChannelMap is identified by a VirtualChannelMapIdentifier, and the VirtualChannelMapVersion carries version information of the VirtualChannelMap. Among all of the tables that are connected to one another along the direction of pointed by the arrows, starting from the MasterSITable, when one of the tables is modified, such modification may result in an increment in a version number of the corresponding table and may also result in an increment in version numbers of all tables hierarchically higher than the corresponding table (up to the MasterSI table). Therefore, by monitoring the MasterSITable a change in the overall SI tables may be immediately recognized. For example, when a change occurs in the SourceTable, such change may increment the value of the SourceVersion, which correspond to the version information of the SourceTable, and such change may also result in a change in a VirtualChannelDescriptionTable, which includes a reference on the SourceTable. As described above, a change in a lower-level table is propagated to higher-level tables, thereby bringing about a change in the MasterSITable.

Only one Master SI Table may exist for one service provider. However, in case the service configuration is different for each regional area or subscribed user (or subscribed user group), it may be more efficient to configure a separate Master SI Table Record for each service configuration in order to provide customized services for each service unit. In this case, the customized service best-fitting the information on the user's subscribed location and the user's subscription information may be provided through a Master SI table during the Service Attachment process.

The Master SI Table Record provides a VirtualChannelMap list. The VirtualChannelMap may be identified by a VirtualChannelMapIdentifier. Each VirtualChannelMap may have at least one or more VirtualChannels, and the VirtualChannelMap designates a location from which detailed information on each VirtualChannel can be acquired (or received). VirtualChannelDescriptionLocation performs the role of designating the location of a VirtualChannelDescriptionTable, which carries detailed channel information.

The VirtualChannelDescriptionTable carries detailed information on the VirtualChannel, and the VirtualChannelDescriptionTable may access a location that provides the corresponding information to the VirtualChannelDescriptionLocation within the VirtualChannelMap.

VirtualChannelServiceID is included in the VirtualChannelDescriptionTable, and the VirtualChannelServiceID performs the role of identifying a service the corresponds to VirtualChanneldescription. The receiver may find the VirtualChannelDescriptionTable by using the VirtualChannelServiceID. In case the receiver receives multiple VirtualChannelDescriptionTables through a Multicast method, the receiver may join the corresponding stream so as to continue to receive the transmitted tables, thereby finding the VirtualChannelDescriptionTable that is identified by a specific VirtualChannelServiceID.

In case of the Unicast method, the receiver may deliver the VirtualChannelServiceID to the server as a parameter and may then receive only the wanted VirtualChannelDescriptionTable.

The SourceTable provides access information (e.g., IP address, port, AV codec, transmission protocol, and so on), which is required for actually accessing a service, and/or Source information for each service. Since one Source may be used for multiple VirtualChannel services, it will be efficient to divided the Source information for each service and provide the divided Source information to the respective service.

The above-described MasterSITable, VirtualChannelMapTable, VirtualChannelDescriptionTable, and SourceTable are divided through four logically separated flows, and, herein, any one of the Push/Pull methods may be used.

However, the MasterSITable may be transmitted by the multicast method in order to manage the version. And, the receiver may always receive the stream that transmits the MasterSITable so as to monitor the change in version.

Figure 22:
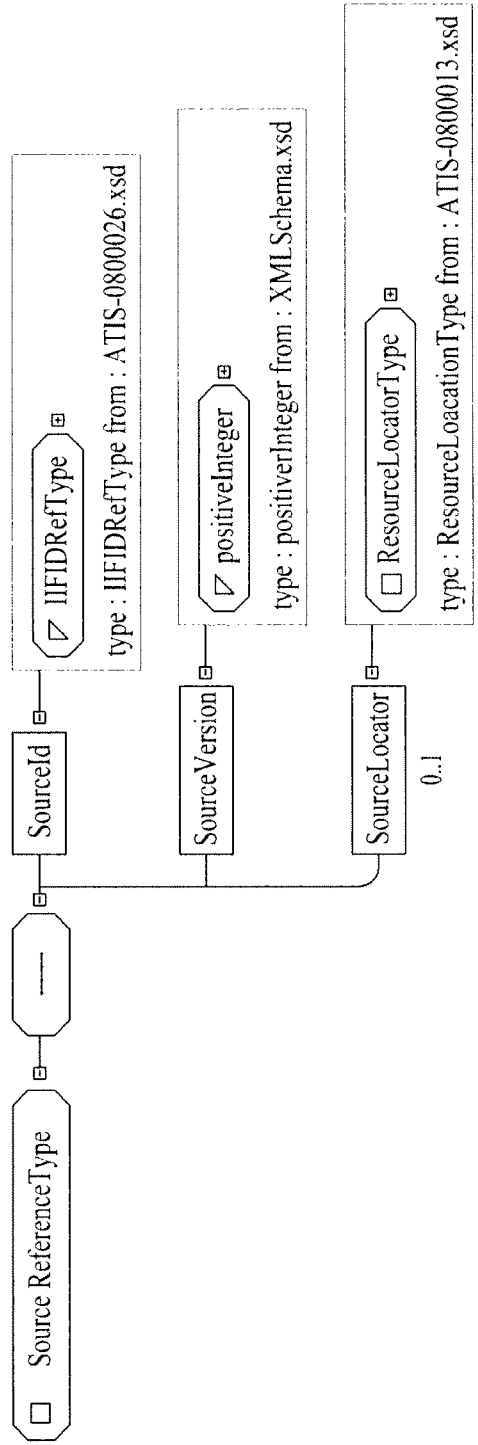
FIG. 22 illustrates an XML schema of a SourceReferenceType according to an embodiment of the present invention.

FIG. 22 illustrates an XML schema of a SourceReferenceType according to an embodiment of the present invention.

According to the embodiment of the present invention, the XML schema of the SourceReferenceType corresponds to a structure that refers to a source element, which carries media source information of a Virtual Channel Service.

SourceReferenceType includes SourceId information, SourceVersion information, and/or SourceLocator information.

SourceId corresponds to an identifier of the referenced Source element.

SourceVersion corresponds to a version of the referenced Source element.

SourceLocator provides a location wherein a Source Table including the referenced Source element can be received. For example, in case a DefaultSourceLocator and the Source element exist at the same time, the Source element overrides the default value.

Figure 23:
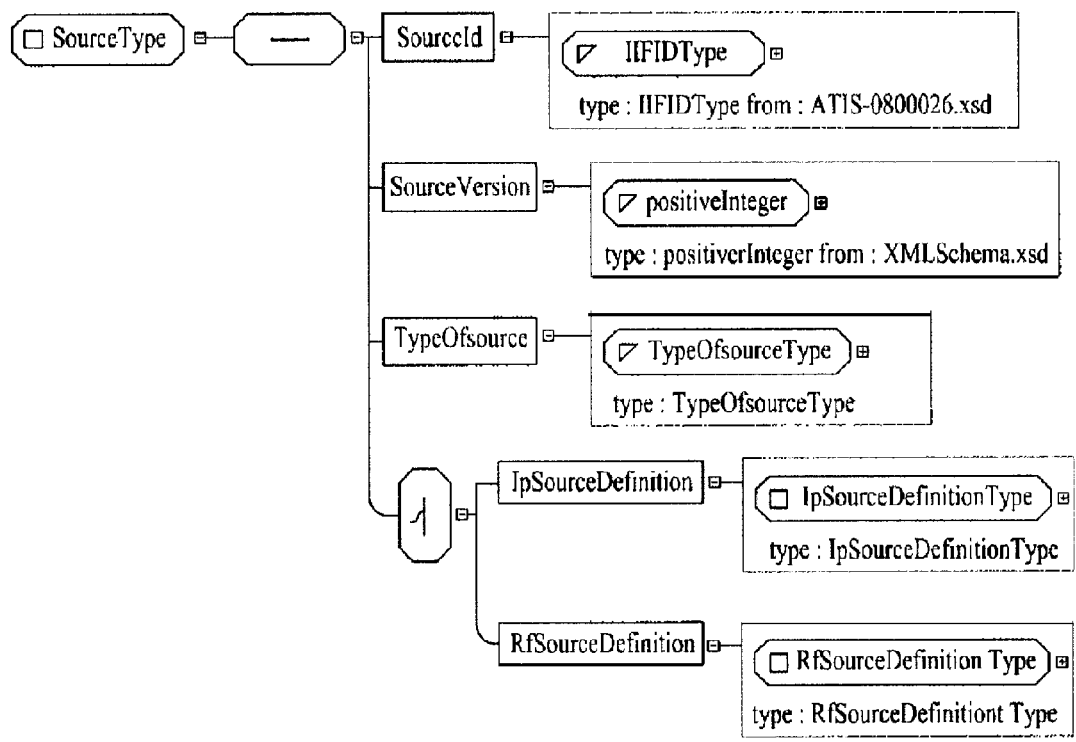
FIG. 23 illustrates an XML schema of a SourceType according to an embodiment of the present invention.

FIG. 23 illustrates an XML schema of a SourceType according to an embodiment of the present invention.

According to the embodiment of the present invention, the XML schema of the SourceType carries information required for acquiring media source of a VirtualChannelService.

SourceType includes SourceId information, SourceVersion information, TypeOfSource information, IpSourceDefinition information, and/or RfSourceDefinition information.

SourceId corresponds to an identifier of the referenced Source element. For example, the identifier should be capable of uniquely identifying this Source element.

SourceVersion corresponds to a version of the referenced Source element. For example, the value of the SourceVersion shall be incremented each time the content of the Source element is changed, altered or modified.

TypeOfSource corresponds to a value indicating the nature of the corresponding Source. For example, the TypeOfSource may indicate the nature of the corresponding Source, such as HD (High Definition), SD (Standard Definition), PIP (Picture in Picture), Barker, and so on.

More specifically, for example, a Barker channel corresponds to a channel designated for advertisement or publicity. Therefore, in case the user is not given the authority for viewing a selected channel and is, therefore, unable to view the corresponding selected channel, the Barker channel is automatically selected. Accordingly, the Barker channel performs the role of advertising the channel selected by the user and providing subscription guidance to the user for viewing the wanted channel.

IpSourceDefinition provides access information of the media source, which is delivered through an IP network. For example, the IpSourceDefinition may notify a Multicast IP address, a transmission protocol, and/or various parameters.

RfSourceDefinition provides access information of the media source, which is delivered through a cable TV network.

FIG. 24 illustrates an extension of an XML schema of a TypeOfSourceType for signaling depth, occlusion, and/or transparency streams according to an embodiment of the present invention.

3DDOT indicates a source for depth, occlusion, and/or transparency streams.

In addition, an IPSourceDefinition and an RFSourceDefinition may be extended in order to provide information regarding Depth, Occlusion, and Transparency (DOT) streams. Providing information in this step may be considered to be similar to providing DOT stream information on a service by service basis in the case of an ATSC or DVB broadcast. In the case of the IPTV, one service may be constructed using various media sources and a number of sources may be specified in a flexible structure as described above. Accordingly, it is possible to provide information on a service by service basis by extending such source level information to provide the DOT information. The 3DDOT information may include information included in the 3D service location descriptor described above.

Figure 25:
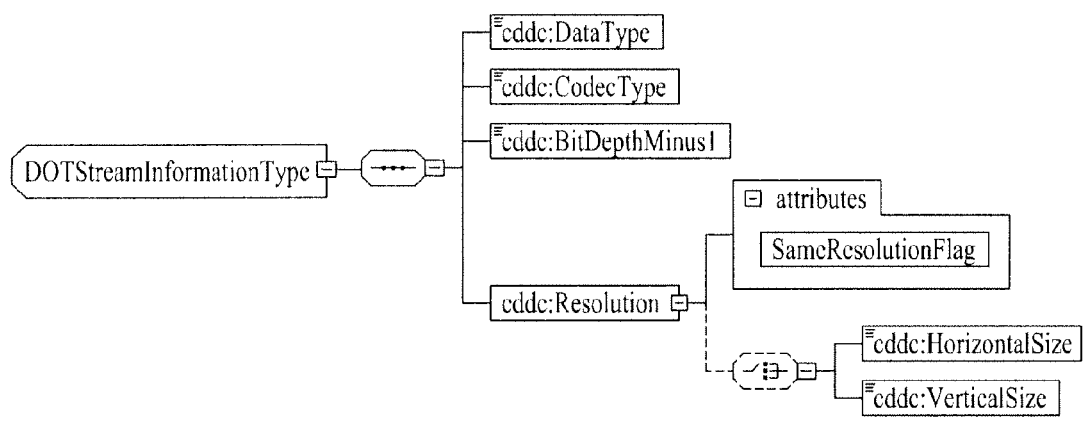
FIG. 25 illustrates an XML Schema of a DOTStreamInformationType for containing 3D DOT stream information according to an embodiment of the present invention.

FIG. 25 illustrates an XML Schema of a DOTStreamInformationType for containing 3D DOT stream information according to an embodiment of the present invention.

The DOTStreamInformationType may include a DataType element, a CodecType element, a BitDepthMinus1 element, a Resolution element, a SameResolutionFlag element, a HorizontalSize element, and/or a VerticalSize element.

The fields are the same as those having similar names included in the 3D service location descriptor described above and thus a detailed description of the fields is replaced with the above description.

The DOTStreamInformationType is a newly defined type for containing information regarding DOT streams and the elements and attributes of the DOTStreamInformationType are the same as those suggested above in the present invention and analysis and usage methods of values thereof are also the same as described above.

In the case where elements are included in metadata of a 3D service source, DOT streams whose information is provided through the elements may be transmitted together with 2D video while being included in the source. In another embodiment, in the case where the elements are included in the metadata of the 3DDOT source, only the DOT streams, which are configured separately from a 2D stream, are included in the source and therefore information regarding the DOT streams is provided within the source.

In addition, a number of sources having different 3D effects may be provided for the same 3D service using a flexible structure of the IPTV which can provide a variety of sources for the same service. In this case, the receiver may select and use a source having a 3D effect preset by the user or a source that can be best represented or supported by the receiver.

FIG. 26 illustrates an XML Schema of a DOTStreamInformationType for containing 3D DOT stream information according to an embodiment of the present invention.

Information items included in the XML Schema in the DOTStreamInformationType are the same as described above and thus a detailed description thereof is omitted and replaced with the above description.

Figure 27:
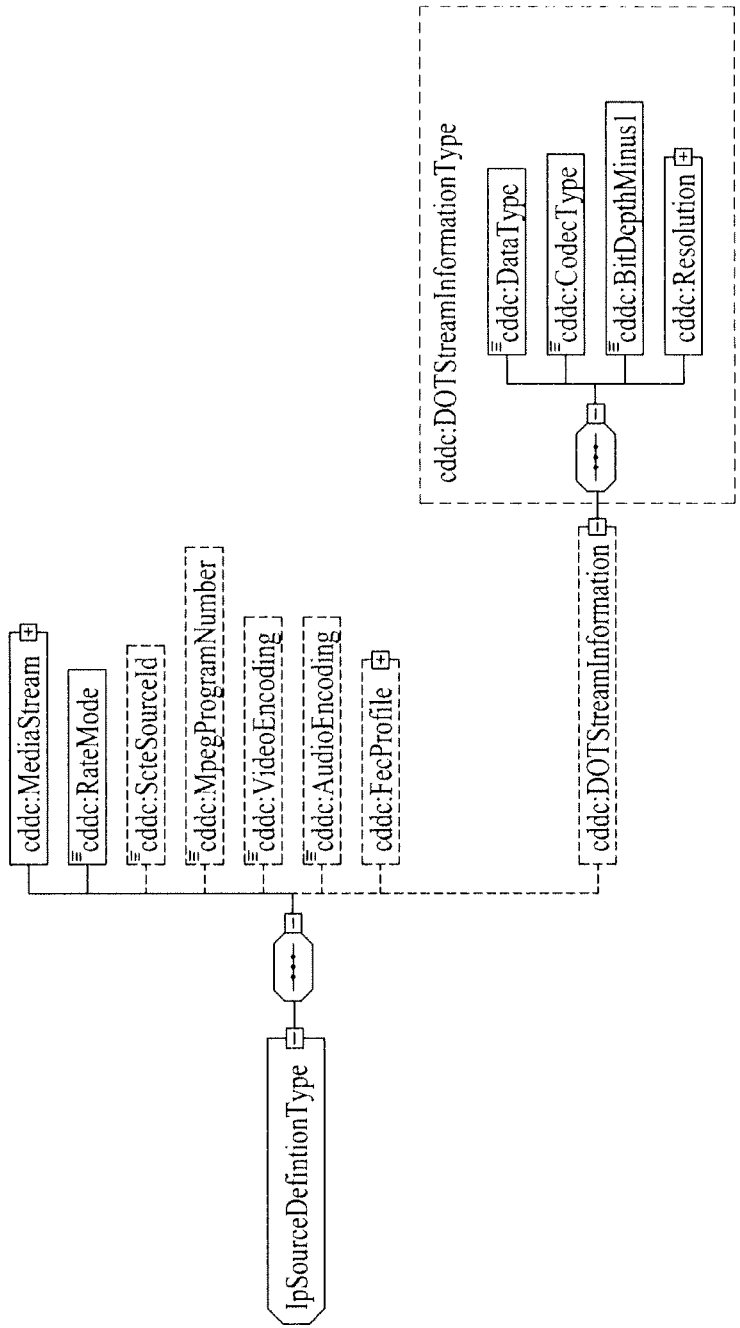
FIG. 27 illustrates an RFSourceDefinition XML schema of IPSourceDefinitionType extended for containing 3D video composition information according to an embodiment of the present invention.

FIG. 27 illustrates an RFSourceDefinition XML schema of IPSourceDefinitionType extended for containing 3D video composition information according to an embodiment of the present invention.

An IpSourceDefinitionType according to an embodiment of the present invention may include a MediaStream element (element), a RateMode element, a ScteSourceId element, an MpegProgramNumber element, a VideoEncoding element, an AudioEncoding element, a FecProfile element, and/or a DOTStreamInformation element.

The MediaStream element includes an IP multicast session description for a media stream of this source. This media stream element includes an asBandwidth attribute. The asBandwidth attribute may be represented in units of a kilobyte per second. The asBandwidth attribute is analyzed as the maximum bit rate.

The RateMode element includes a programming source rate type. For example, the RateMode element may indicate a constant Bit Rate (CBR) or a Variable Bit Rate (VBR).

The ScteSourceId element may include a source ID of an MPEG-2 TS.

The MpegProgramNumber element may include an MPEG Program Number.

The VideoEncoding element indicates a video encoding format of a media source.

The AudioEncoding element may indicate a description of audio coding used in the programming source in the format of an audio MIME type registered in an IANA.

The FecProfile element may indicate an IP FEC profile if possible.

The DOTStreamInformation element signals information required to render or format a 2D image into a 3D image. The DOTStreamInformation element may include a DataType element, a CodecType element, a BitDepthMinus1 element, and/or a Resolution element.

The Resolution element may include a SameResolutionFlag element, a HorizontalSize element, and/or a VerticalSize element as described above.

A further detailed description of the elements is replaced with the above description since the elements are similar to those described above.

Figure 28:
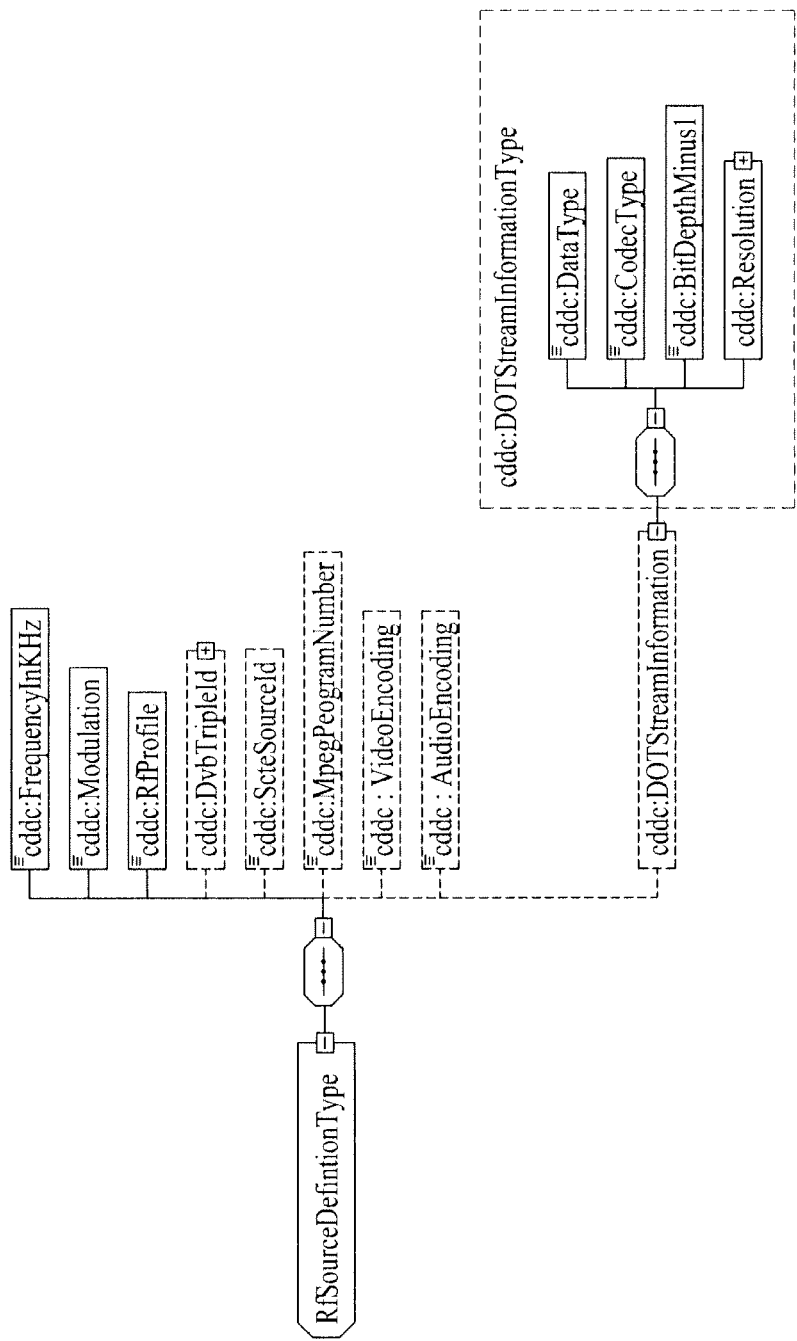
FIG. 28 illustrates a schema of an RfSourceDefinitionType XML extended for containing 3D DOT stream information according to an embodiment of the present invention.

FIG. 28 illustrates a schema of an RfSourceDefinitionType XML extended for containing 3D DOT stream information according to an embodiment of the present invention.

An RfSourceDefinitionType according to an embodiment of the present invention includes a FrequencyInKHz element, a Modulation element, an RfProfile element, a DvbTripleId element, a ScteSourceId element, an MpegProgramNumber element, a VideoEncoding element, an AudioEncoding element, and/or a DOTStreamInformation element.

The FrequencyInKHz element indicates an RF frequency of the source in units of KHz. This indicates the central frequency regardless of the type of modulation.

The Modulation element indicates the type of RF modulation. For example, the Modulation element may indicate NTSC, QAM-64, QAM-256, or 8-VSB.

The RfProfile element may indicate a basic stream format. For example, the RfProfile element may indicate SCTE, ATSC, or DVB.

The DvbTripleId element indicates a DVB Triplet identifier for a broadcast stream.

The ScteSourceId element may include a Source ID of an MPEG-2 TS.

The MpegProgramNumber element may indicate an MPEG-2 program number.

The VideoEncoding element may indicate a description of video coding used for the programming source.

The AudioEncoding element may indicate a description of audio coding used for the programming source.

The DOTStreamInformation element signals information required to render or format a 2D image into a 3D image. The DOTStreamInformation element may include a DataType element, a CodecType element, a BitDepthMinus1 element, and/or a Resolution element.

The Resolution element may include a SameResolutionFlag element, a HorizontalSize element, and/or a VerticalSize element as described above.

A further detailed description of the elements is replaced with the above description since the elements are similar to those described above.

In the case where 3D DOT information is provided through a stream separated from a 3D media stream, the 3D DOT information may be signaled through a source whose source type is 3DDOT. In this case, the receiver may simultaneously receive a 2D service source containing an AV stream of a 2D service and a source containing a 3D DOT stream and format the 2D service source into a 3D image (or 3D video) using the 3D DOT to provide a 3D video service.

As well as 3D DOT stream information is provided through a new signaling stage of the IPTV, media signals of the IPTV are configured as an MPEG-2 TS having a format similar to a conventional digital broadcast and are then transmitted through an IP network. Therefore, as described above, 3D DOT stream information may be provided through a variety of tables (a PMT, a TVCT, and/or an SDT) of the SI stage or through a separate ES and an 2D image may then be formatted into a 3D image using the same to provide a 3D video service.

Figure 29:
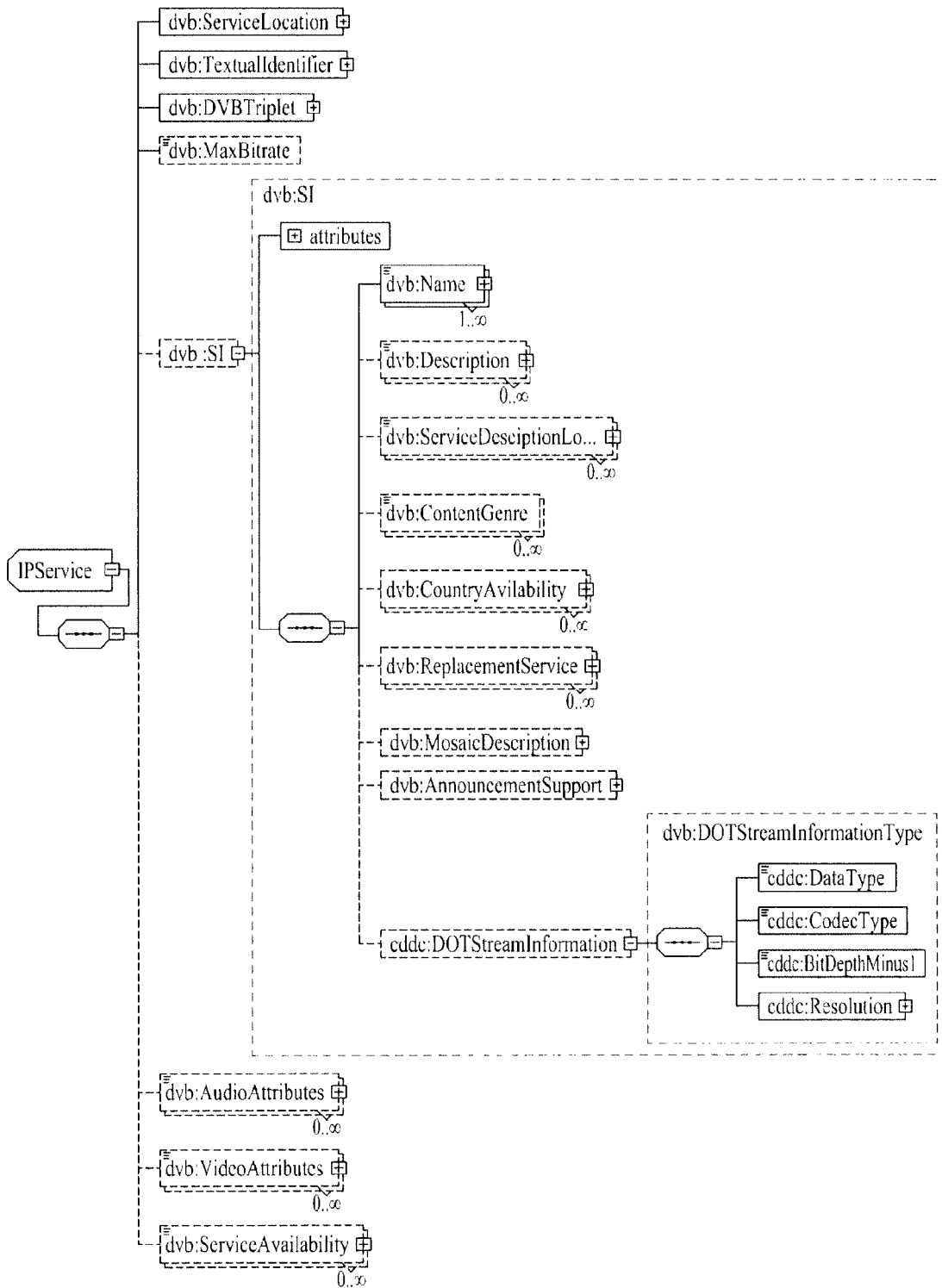
FIG. 29 illustrates a schema of an IpService XML extended for containing 3D DOT stream information according to an embodiment of the present invention.

FIG. 29 illustrates a schema of an IpService XML extended for containing 3D DOT stream information according to an embodiment of the present invention.

The IpService according to this embodiment includes a ServiceLocation element, a TextualIdentifier element, a DVBTriplet element, a MaxBitrate element, an SI element, a VideoAttributes element, an AudioAttributes element, and/or a ServiceAvailabilty element.

The ServiceLocation element may indicate a location at which the service can be located.

The TextualIdentifier element may indicate a text-format ID indicating the service. When the domain name is lost, it can be acquired based on the anteroposterior relation (i.e., the context).

The DVBTriplet element may indicate a DVB Triplet indicating the service. This may match service details in the TS.

The MaxBitrate element may indicate the maximum bit rate (in Kbits/s) at which the TS including the service operates.

The SI element may include service information of the service.

The SI element may include a Name element, a Description element, a service description location element, a content genre element, a country availability element, a replacement service element, a mosaic description element, an announcement support element, and/or a DOTStreamInformation element.

The Name element may indicate a name of the service known to the user in a text format.

The Description element may indicate a text description of the service.

The ServiceDescriptionLocation element may indicate an identifier of a BCG record for a BCG discovery element that carries the provided information.

The ContentGenre element may indicate a (main) genre of the service.

The CountryAvailability element may indicate a list of countries where the service is available or unavailable.

The ReplacementService element may indicate details of connection to another service in the case where a service referenced by the SI record has failed to be provided.

The MosaicDescription element may indicate details of a service, which is displayed as a mosaic stream, and a service package.

The AnnouncementSupport element may indicate an announcement that is supported by the service. The AnnouncementSupport element may also indicate link information of the location of the announcement.

The DOTStreamInformation element signals information required to render or format a 2D image into a 3D image. The DOTStreamInformation element may include a DataType element, a CodecType element, a BitDepthMinus1 element, and/or a Resolution element.

The Resolution element may include a SameResolutionFlag element, a HorizontalSize element, and/or a VerticalSize element as described above.

A description of these elements is replaced with the above description since the elements are similar to those described above.

The VideoAttributes element may indicate a video coding method that can be used at a specific time during the service operation time.

The AudioAttributes element may indicate an audio coding method that can be used at a specific time during the service operation time.

The ServiceAvailabilty element may define a region where the corresponding service can be provided or a region where the corresponding service cannot be provided.

According to an embodiment of the present invention, in a DVB IPTV system, each IPTV service is represented within a DVB Service Discovery and Selection (SD&S) in units of IPServices. Among them, the SI element provides additional detailed information on the service. Most of these information items provide the same information included in the SDT in the DVB SI. This may be extended by adding a DOTStreamInformation element as described below. This makes it possible to provide 3D DOT Stream information that can be used for each service.

Also in the DVB IPTV system, media signals of the IPTV may be configured in an MPEG-2 TS format and may then be transmitted through an IP network such that DVB SI information in the TS is used in a format similar to a conventional DVB broadcast in the same manner as described above. Accordingly, the above method for transmitting a 3D service location descriptor and/or a DOT stream can also be applied to the DVB IPTV system.

Figure 30:
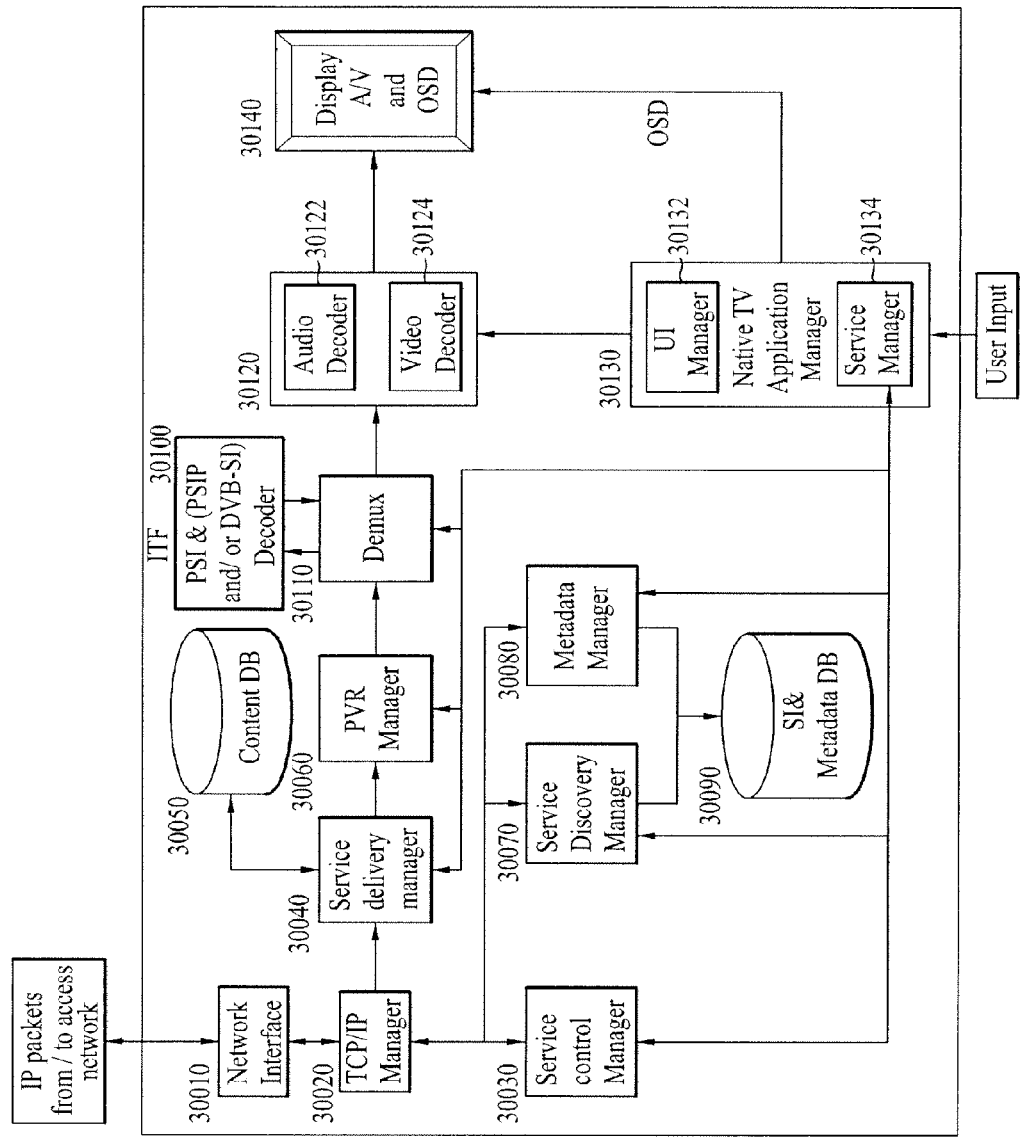
FIG. 30 illustrates an IPTV receiver according to an embodiment of the present invention.

FIG. 30 illustrates an IPTV receiver according to an embodiment of the present invention.

According to the embodiment of the present invention, the IPTV receiver includes a Network Interface (30010), a TPC/IP Manager (30020), a Service Control Manager (30030), a Service Delivery Manager (30040), a Content DB (30050), a PVR manager (30060), a Service Discovery Manager (30070), a Service Manager (30080), a SI & Metadata DB (30090), a PSI & (PSIP and/or DVB-SI) Decoder (30100), a DEMUX (30110), an Audio and Video Decoder (30120), a Native TV Application manager (30130), and/or an A/V and OSD Displayer (30140).

The Network Interface (30010) performs the role of transmitting/receiving an IPTV packet. The Network Interface (30010) operates in a physical layer and/or in a data link layer.

The TPC/IP Manager (30020) is involved in end to end packet transmission. More specifically, the TPC/IP Manager (30020) performs the role of managing packet transmission from source to destination. The TPC/IP Manager (30020) performs the role of distributing the IPTV packets to the appropriate managers, thereby transmitting the distributed IPTV packets.

The Service Control Manager (30030) performs the role of selecting a service and controlling the selected service. The Service Control Manager (30030) may also perform the role of managing sessions. For example, the Service Control Manager (30030) may use an IGMP (Internet Group Management Protocol) or an RTSP, so as to select a real-time broadcast service. For example, the Service Control Manager (30030) may use the RTSP to select VOD (Video on Demand) contents. For example, when an IMS (IP Multimedia Subsystem) is used, the Service Control Manager (30030) uses an SIP (session initiation protocol) so as to perform session initialization and/or management via an IMS gateway. RTSP protocol can be used in controlling of the delivery of broadcast TV and audio as well as for on-demand delivery. RTSP protocol uses a persistent TCP connection and allows trick mode control on real-time media streaming.

The operation of the Service Delivery Manager (30040) relates to real-time streaming and/or handling content download. The Service Delivery Manager (30040) retrieves contents from the Content DB (30050) for future usage. The Service Delivery Manager (30040) may use a Real-Time Transport Protocol (RTP)/RTP Control Protocol (RTCP), which are used along with the MPEG-2 Transport Stream (TS). In this case, the MPEG-2 packet is encapsulated by using the RTP. The Service Delivery Manager (30040) parses the RTP packet and then transmits the parsed packet to the DEMUX (30110). The Service Delivery Manager (30040) may use the RTCP so as to perform the role of transmitting a feedback on a network reception. Without using the RTP, the MPEG-2 Transport packets may be directly transmitted by using a UDP (user datagram protocol). In order to perform contents downloading, the Service Delivery Manager (30040) may use an HTTP (hypertext transfer protocol) or a FLUTE (File Delivery over Unidirectional Transport) as the transmission protocol. The Service Delivery Manager (30040) may perform the role of processing a stream, which transmits the 3D DOT information. More specifically, when the above-described 3D DOT information is transmitted through a stream, the processing of the 3D DOT information may be performed by the Service Delivery Manager (30040).

Content DB (30050) is a database for Contents which may be delivered by content download system or may be recorded from live media TV.

PVR manager (30060) is responsible for recording and/or playing live streaming contents, and gathering all the necessary metadata of the recorded content, and/or generating additional information for better user experience (e.g. thumbnail image, index etc).

Service Discovery Manager (30070) is enabling of the discovery of IPTV services over bi-directional IP network. Service Discovery Manager (30070) provides all the information for selecting service.

Metadata Manager (30080) manages the processing of metadata.

SI & Metadata DB (30090) is a database for Service Discovery information and Metadata related to the services.

PSI & (PSIP and/or DVB-SI) Decoder (30100) is a PSI (and PSIP/DVB-SI) Control Module. PSI & (PSIP and/or DVB-SI) Decoder (30100) sets PIDs for PSI tables and PSIP/DVB-SI tables to DEMUX. PSI & (PSIP and/or DVB-SI) Decoder (30100) decodes the private sections of PSI and (PSIP and/or DVB-SI) sent by DEMUX. The decoding result is used to de-multiplex input transport packets. (e.g set Audio and Video PID to DEMUX.)

DEMUX (30110) is configured to de-multiplex audio, video and/or PSI tables from input transport packets. DEMUX (30110) is controlled for the de-multiplexing for PSI tables by PSI Decoder. DEMUX (30110) is configured to make the sections of PSI tables and sending them to PSI Decoder. DEMUX (30110) is controlled for the de-multiplexing for A/V transport packets.

The Audio and Video Decoder (30120) may decode audio and/or video elementary stream packets. Herein, the Audio and Video Decoder (30120) may include an Audio Decoder (30122) and/or a Video Decoder (30124). The Audio Decoder (30122) decodes audio elementary stream packets. And, the Video Decoder (30124) decodes video elementary stream packets. The Audio and Video Decoder (30120) may produce 3D stereoscopic video by decoding the DOT stream, and using the DOT stream and 2D video stream to generate virtual view.

The Native TV Application manager (30130) includes a UI Manager (30132) and/or a Service Manager (30134). The Native TV Application manager (30130) supports a Graphic User Interface within a TV screen. The Native TV Application manager (30130) may receive a user key, which is inputted through a remote controller or a front panel. The Native TV Application manager (30130) may manage the status of the TV system. The Native TV Application manager (30130) may perform the role of configuring a 3D OSD and the role of controlling the output of the 3D OSD.

The UI Manager (30132) may perform the role of controlling the IPTV receiver so as to display a User Interface on the TV screen.

The Service Manager (30134) performs the role of controlling managers related to services. For example, the Service Manager (30080) may control the Service Control Manager (30030), the Service Delivery Manager (30040), an IG-OITF client, the Service Discovery Manager (30070), and/or the Metadata manager (30080). The Service Manager (30134) processes the 3D depth related information and control the display of the 3D OSD. For example, the Service Manager (30134) may process the 3D depth related information, and, then, the Service Manager (30134) may deliver the processed result to the UI Manager (30132). The UI Manager (30132) uses the 3D depth related information, which is delivered from the Service Manager (30134), so as to control the output of the 3D OSD.

The A/V and OSD Displayer (30140) receives audio data and video data and then controls the display of the video data and the playing of the audio data. The A/V and OSD Displayer (30140) controls the output of the OSD. In case of the 3D service, the A/V and OSD Displayer (30140) may perform the function of a 3D Output Formatter, which receives left view and right view images and outputs the received left view and right view images as a Stereoscopic video. During this process, the 3D OSD may also be outputted along with the Stereoscopic video.

Figure 31:
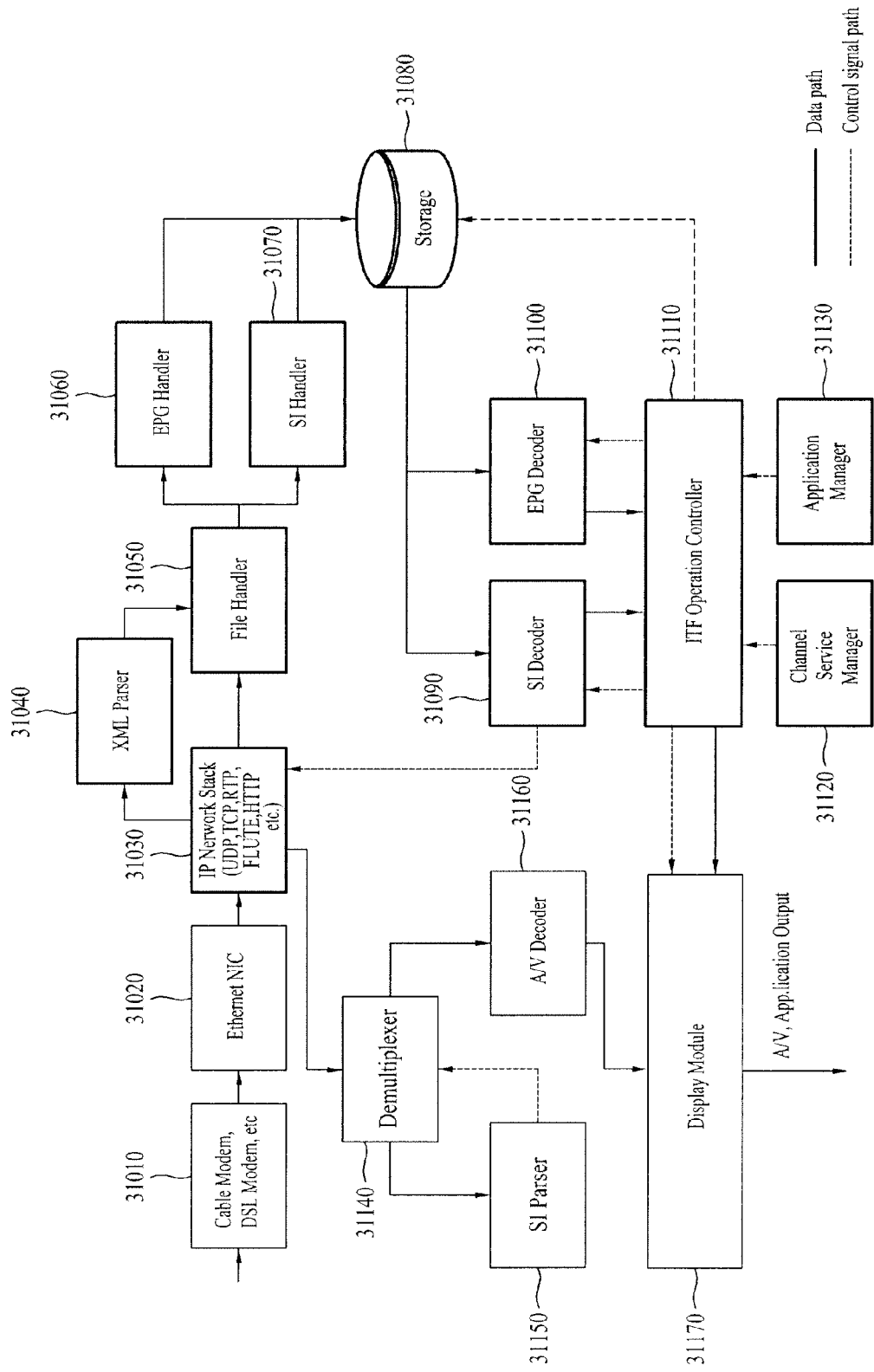
FIG. 31 illustrates functional blocks of an IPTV receiver according to an embodiment of the present invention.

FIG. 31 illustrates functional blocks of an IPTV receiver according to an embodiment of the present invention.

The functional blocks of the IPTV receiver according to the embodiment of the present invention may include a cable modem, a DSL modem (31010), an Ethernet NIC (Ethernet NIC, 31020), an IP network stack (31030), an XML parser (31040), a file handler (31050), an EPG handler (31060), an SI handler (31070), a storage device (31080), an SI decoder (31090), an EPG decoder (31100), an ITF operation controller (31110), a channel service manager (31120), an application manager (31130), an MPEG-2 demultiplexer (31140), an MPEG-2 PSI/PSIP parser (31150), an audio/video decoder (31160), and/or a display module (31170).

Herein, the blocks that are mostly used in the present invention are marked in bold lining, and the straight-lined arrows indicate the Data path, and the dotted-lined arrows indicate Control signal path. Hereinafter, each block will now be described in detail.

The cable modem, the DSL modem (31010) demodulates a signal that is transmitted through an interface, through which an ITF is connected to an IP network in a physical layer, or through physical medium, thereby recovering a digital signal.

The Ethernet NIC (Ethernet NIC, 31020) corresponds to a module recovering a signal, which is received through a physical interface, to IP data.

The IP network stack (31030) corresponds to a processing (or handling) module of each layer according to the IP protocol stack.

Among the received IP data, the XML parser (31040) parses XML documents.

Among the received IP data, the file handler (31050) handles (or processes) data that are transmitted in a file format through the FLUTE.

Among the data received in a file format, the EPG handler (31060) handles (or processes) a portion corresponding to IPTV EPG data and stores the processed data in the storage device (31080).

Among the data received in a file format, the SI handler (31070) handles (or processes) a portion corresponding to IPTV SI data and stores the processed data in the storage device (31080).

The storage device (31080) corresponds to a storage device configured to store data that require storage, such as SI, EPG, and so on.

When Channel Map information is required, the SI decoder (31090) retrieves the SI data from the storage device (31080), so as to analyze the retrieved data and to recover the required information.

When EPG information is required, the EPG decoder (31100) retrieves the EPG data from the storage device (31080), so as to analyze the retrieved data and to recover the required information.

The ITF operation controller (31110) corresponds to a main controller that can control the operations of the ITF, such as channel change, EPG display, and so on.

The channel service manager (31120) corresponds to a module that receives input from the user and manages the operation of changing channels.

The application manager (31130) corresponds to a module that receives input from the user and manages application services, such as EPG display.

The MPEG-2 demultiplexer (31140) corresponds to a module that extracts MPEG-2 transmission stream data from the received IP datagram and that delivers the extracted MPEG-2 transmission stream data to module respective to each PID.

The MPEG-2 PSI/PSIP parser (31150) corresponds to a module that can extract PSI/PSIP data, which carry information enabling access to a program element, such as PID information for each set of data (audio/video data, and so on) of the MPEG-2 transmission stream within the received IP datagram, and that can parse the extracted PSI/PSIP data.

The audio/video decoder (31160) corresponds to a module that can decode the received audio data and video data and that can deliver the decoded audio/video data to the display module. The audio/video decoder (31160) may produce 3D stereoscopic video by decoding the DOT stream and using the DOT stream and 2D video stream to generate virtual view.

The display module (31170) combines the received AV signal and OSD signal and processes (or handles) the combined signal, so that processed signal can be outputted to the screen and through a speaker. Also, in case of a 3D video, the display module (31170) performs the function of dividing the image into L/R images and outputting the divided L/R images as a 3D image (or video) through a formatter. Furthermore, by using the 3D depth related information, the display module (31170) may also perform the function of processing (or handling) the OSD, so that the OSD can be displayed along with the 3D image (or video).

Figure 32:
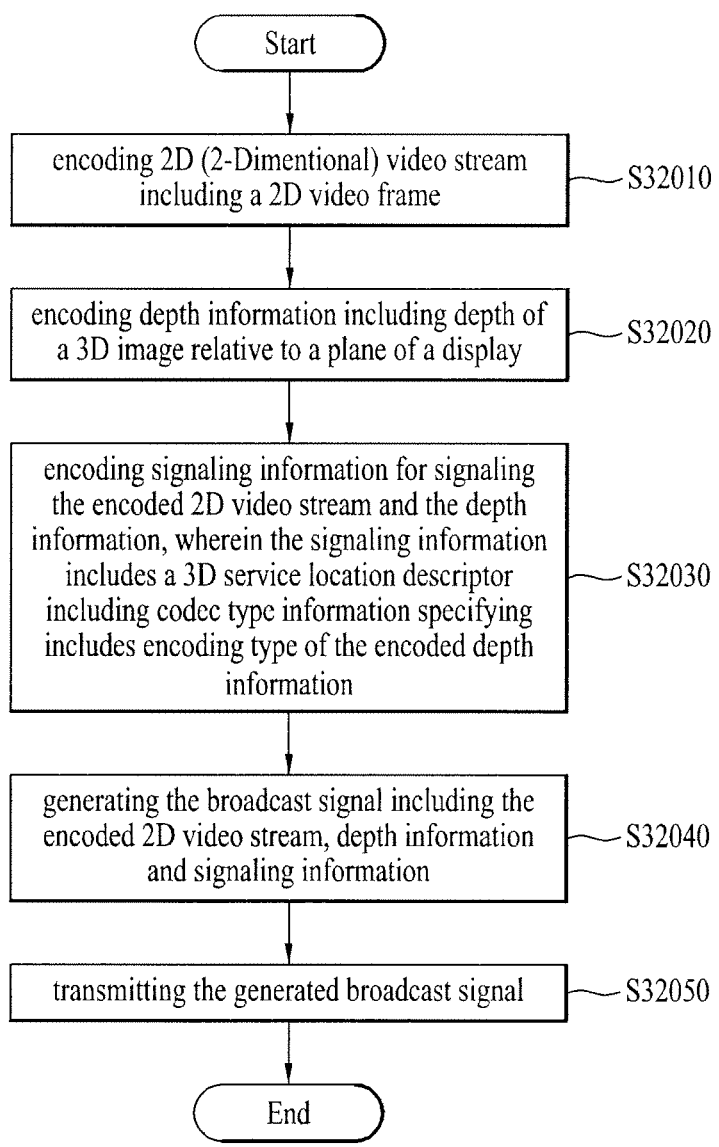
FIG. 32 is a flow chart illustrating a method for processing a 3D broadcast signal according to an embodiment of the present invention.

FIG. 32 is a flow chart illustrating a method for processing a 3D broadcast signal according to an embodiment of the present invention.

The receiver encodes a 2D video stream that transmits a 2D video frame (s32010).

The receiver encodes depth information including a depth value from the display plane of a 3D image (s32020). The receiver may encode occlusion information and/or transparency information.

The receiver encodes signaling information for signaling depth information of the 2D video stream (S32030). The signaling information includes a 3D service location descriptor and the 3D service location descriptor includes codec type information for identifying the coding type of the depth information.

The receiver generates a broadcast signal including the 2D video stream, the depth information, and the signaling information (s32040).

The receiver transmits the generated broadcast signal (s32050).

As described above, the present invention has an advantage in that it is possible to efficiently provide a 3D broadcast service without imposing a burden on the broadcast bandwidth.

In addition, the present invention has an advantage in that it is possible to efficiently transmit and process signaling information required to provide a 3D broadcast service.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

What is claimed is:

1. A method for processing a broadcast signal for 3D (3-Dimensional) broadcast service, the method comprising:
    encoding 2D (2-Dimensional) video stream including a 2D video frame;
    encoding depth information including depth of a 3D image relative to a plane of a display;
    encoding signaling information for signaling the encoded 2D video stream and the depth information, wherein the signaling information includes a 3D service location descriptor including codec type information specifying encoding type of the encoded depth information;
    generating the broadcast signal including the encoded 2D video stream, depth information and signaling information; and
    transmitting the generated broadcast signal,
    wherein the 3D service location descriptor includes resolution information indicating whether a resolution of a 3D video frame is same as a resolution of the 2D video frame.

2. The method of claim 1, further comprising:
    encoding occlusion information for rendering the 2D video frame into the 3D video frame; and generating the broadcast signal including the encoded 2D video stream, depth information, signaling information and the occlusion information.

3. The method of claim 2, further comprising:
encoding transparency information of an object in the 3D video frame for rendering the 2D video frame into a 3D video frame; and
generating the broadcast signal including the encoded 2D video stream, depth information, signaling information, the occlusion information and the transparency information.

4. The method of claim 1, wherein the 3D service location descriptor is included in a virtual channel table (VCT) or a program map table (PMT).

5. The method of claim 3, wherein the 3D service location descriptor further includes data type information specifying which one among the depth information, the occlusion information and the transparency information is included in an element of the broadcast signal.

6. The method of claim 3, wherein the signaling information further includes component type information indicating whether a specific stream is a depth stream including the depth information, an occlusion stream including the occlusion information or a transparency stream including the transparency information.

7. An apparatus for receiving a broadcast signal for 3D (3-Dimensional) broadcast service, the apparatus comprising:
a receiving unit receiving the broadcast signal including a 2D video stream including a 2D video frame, depth information and signaling information;
a system information processor parsing a 3D service location descriptor including codec type information specifying encoding type of information included in the broadcast signal from the signaling information, wherein the depth information includes depth of a 3D image relative to a plane of a display;
a first decoder decoding the 2D video stream;
a second decoder decoding the depth information based on the codec type information; and
a formatter rendering the 2D video frame into a 3D video frame based on the depth information,
wherein the 3D service location descriptor includes resolution information indicating whether a resolution of a 3D video frame is same as a resolution of the 2D video frame.

8. The apparatus of claim 7,
wherein the broadcast signal further includes occlusion information for rendering the 2D video frame into the 3D video frame,
wherein the second decoder decodes the occlusion information based on the codec type information, and
wherein the formatter renders the 2D video frame into a 3D video frame based on the depth information and the occlusion information.

9. The apparatus of claim 8,
wherein the broadcast signal further includes transparency information of an object in the 3D video frame for rendering the 2D video frame into a 3D video frame,
wherein the second decoder decodes the transparency information based on the codec type information, and
wherein the formatter renders the 2D video frame into a 3D video frame based on the depth information, the occlusion information and the transparency information.

10. The apparatus of claim 7, wherein the system information processor parse a virtual channel table (VCT) or a program map table (PMT) from the signaling information and parse the 3D service location descriptor included in the virtual channel table (VCT) or the program map table (PMT).

11. The apparatus of claim 9,
wherein the 3D service location descriptor further includes data type information specifying which one among the depth information, the occlusion information and the transparency information is included in an element of the broadcast signal,
wherein the second decodes the element based on the data type information.

12. The apparatus of claim 9,
wherein the signaling information further includes component type information indicating whether a specific stream is a depth stream including the depth information, an occlusion stream including the occlusion information or a transparency stream including the transparency information,
wherein the second decoder decodes the depth stream, occlusion stream or transparency stream based on the component type information.

13. The apparatus of claim 7, wherein the 3D service location descriptor further includes size information specifying horizontal and vertical size of the 3D video frame when the resolution information indicates that the resolution of the 3D video frame is different from the resolution of the 2D video frame.

* * * * *